US012723530B2

(12) United States Patent
Sugimoto et al.

(10) Patent No.: US 12,723,530 B2
(45) Date of Patent: Sep. 1, 2026

(54) EXHAUST GAS RECTIFIER AND EXHAUST GAS PURIFICATION SYSTEM

(71) Applicant: Yanmar Holdings Co., Ltd., Osaka (JP)

(72) Inventors: Kazuma Sugimoto, Osaka (JP); Takeharu Furukawa, Osaka (JP)

(73) Assignee: Yanmar Holdings Co., Ltd., Osaka (JP)

( * ) Notice: Subject to any disclaimer, the term of this patent is extended or adjusted under 35 U.S.C. 154(b) by 0 days.

(21) Appl. No.: 18/219,719

(22) Filed: Jul. 10, 2023

(65) Prior Publication Data

US 2024/0018888 A1 Jan. 18, 2024

(30) Foreign Application Priority Data

Jul. 13, 2022 (JP) ................................ 2022-112489

(51) Int. Cl.

*F01N 3/20* (2006.01)
*B01D 53/94* (2006.01)
*F01N 3/035* (2006.01)
*F01N 3/28* (2006.01)
*F01N 13/02* (2010.01)

(52) U.S. Cl.

CPC ....... *F01N 3/2066* (2013.01); *B01D 53/9431* (2013.01); *F01N 3/035* (2013.01); *F01N 3/2892* (2013.01); *F01N 13/02* (2013.01); *B01D 2251/2067* (2013.01); *B01D 2257/40* (2013.01); *B01D 2258/01* (2013.01); *B01D 2259/124* (2013.01); *F01N 2610/02* (2013.01); *F01N 2610/1453* (2013.01)

(58) Field of Classification Search

CPC ...... F01N 3/2066; F01N 3/035; F01N 3/2892; F01N 13/02; F01N 13/00; F01N 13/1872; F01N 2610/02; F01N 2610/1453; F01N 2610/1446; F01N 2240/20; B01D 53/9431; B01D 2258/01; B01D 2259/124; B01D 2257/40; B01D 2251/2067

USPC ........................................................ 422/171

See application file for complete search history.

(56) References Cited

U.S. PATENT DOCUMENTS

| | | | | |
|---|---|---|---|---|
| 10,179,315 B2 * | 1/2019 | Brandl | ................ | B01F 25/3141 |
| 2009/0092525 A1 * | 4/2009 | Ichikawa | .............. | F01N 3/2066<br>422/177 |
| 2015/0110681 A1 * | 4/2015 | Ferront | ............... | B01F 23/2132<br>422/168 |
| 2016/0281564 A1 * | 9/2016 | Tanaka | ................. | F01N 3/2066 |

(Continued)

FOREIGN PATENT DOCUMENTS

| | | | | |
|---|---|---|---|---|
| CN | 110821615 A * | 2/2020 | ........... | F01N 3/2066 |
| DE | 102012224198 A1 | 6/2014 | | |
| EP | 2865861 A1 | 4/2015 | | |

(Continued)

*Primary Examiner* — Devon C Kramer
*Assistant Examiner* — Kelsey L Stanek
(74) *Attorney, Agent, or Firm* — Chris Mizumoto

(57) ABSTRACT

The exhaust gas rectifier has an exhaust gas deflector disposed at an upstream side with respect to a urea water injection device in a direction in which exhaust gas flows. The exhaust gas deflector includes a plurality of individual regions which have an opening part through which the exhaust gas passes. The plurality of the individual regions are arranged in one direction. The opening ratio in the plurality of the individual regions is different in one direction.

14 Claims, 22 Drawing Sheets

(56) References Cited

U.S. PATENT DOCUMENTS

2018/0080362 A1* 3/2018 Kasai .................... F01N 3/2892
2020/0032692 A1* 1/2020 Wang .................... F01N 3/0293

FOREIGN PATENT DOCUMENTS

EP 3073079 A1 9/2016
EP 3205852 A1 8/2017
JP 4930796 B2 * 5/2012
JP 2014118944 A * 6/2014
WO WO-2012172945 A1 * 12/2012 .............. B01F 25/25

* cited by examiner

CONTROL UNIT
ECU
DCU
50
51
52
10
12
12T
12S
12e
12d
12f
12a
12b
12c
12P
11
11a
11b
11P
21
22
23
24
25
26
27
28
29
30
31
32
33
41
42
43
44
45
46
47
60
70
71
72
73,80

AR1<AR2<AR3

AR3<AR1<AR2

EXHAUST GAS RECTIFIER AND EXHAUST GAS PURIFICATION SYSTEM

CROSS-REFERENCE

This application claims foreign priority of JP2022-112489, filed Jul. 13, 2022 the disclosure of which is hereby incorporated by reference in its entirety.

TECHNICAL FIELD

The present invention relates to an exhaust gas rectifier and an exhaust gas purification system.

BACKGROUND ART

A technique for reducing nitrogen oxides contained in exhaust gas in a diesel engine is disclosed in, for example, Patent Document 1. Patent Document 1 provides an SCR catalyst for urea selective catalytic reduction and a urea water injection unit in the middle of an exhaust pipe through which exhaust gas passes in order to the purify exhaust gas. The exhaust gas is then mixed with urea water to be caused to pass through the SCR catalyst, thereby reducing nitrogen oxides in the exhaust gas.

PRIOR ART DOCUMENT

Patent Document

Patent Document 1: Japanese Unexamined Patent Application Publication No. 2016-075213

SUMMARY OF INVENTION

Technical Problem

When urea water injected from a urea water injection device locally collides with an inner surface of piping through which hot exhaust gas flows, evaporation latent heat of urea water causes temperature of the piping to drop locally, resulting in generation of solid materials (deposits) originated from the unevaporated urea. In particular, if more urea water collides with a lower surface in a gravity direction in piping, and a pool of the urea water occurs, thereby increasing a risk of generation of deposits originated from the unevaporated urea. When deposits accumulate in the piping, that can lead to deterioration of fuel consumption due to an increase in an exhaust pressure loss, an increase in nitrogen oxide emission amount due to a decrease in urea mixability, and breakage of a catalyst that is caused by collision the catalyst at a downstream side with deposits when the deposits are generated to be peeled off. Thus, it is necessary to reduce the risk of generation of deposits.

The present invention has been made to solve the above-mentioned problem, and an object of the invention is to provide an exhaust gas rectifier and an exhaust gas purification system that can reduce the risk of generation of deposits originated from urea at a downstream side of the urea water injection device.

Solution to Problem

An exhaust gas rectifier according to one aspect of the present invention has an exhaust gas deflector disposed at an upstream side with respect to a urea water injection device in a direction in which exhaust gas flows, wherein the exhaust gas deflector includes a plurality of individual regions which have an opening part through the exhaust gas passes, the plurality of individual regions are arranged in one direction, and the opening ratios of the plurality of the individual regions are different in the one direction.

The exhaust gas purification system according to another aspect of the present invention includes the above-mentioned exhaust gas rectifier, a DPF system, and an SCR system including the urea water injection device.

Advantageous Effects of Invention

It is possible to reduce a risk of generation of deposits originated from urea at a downstream side of a urea water injection device.

DESCRIPTION OF EMBODIMENTS

An embodiment of the present invention will be described as follows on the basis of figures. A tractor will be described using an example as a work vehicle in the present embodiment. The work vehicle may be a riding work vehicle or an unmanned work vehicle other than a tractor. The above-mentioned riding work vehicle includes, for example, various types of harvesters, mowing machines, rice transplanters, combine harvesters, civil engineering and construction work machines (such as wheel loaders), and snow-removing vehicles. The above-mentioned unmanned work vehicles also include unmanned mowing machines.

Unless otherwise mentioned, the present specification defines as "front" a direction in which a tractor travels as a work vehicle during work and defines as "rear" the opposite direction. Further, a right side toward a traveling direction of the tractor is defined as "right" and a left side of the same is defined as "left". A direction perpendicular to a front and rear direction and a left and right direction of the tractor is defined as a "up and down direction". In this case, a downstream side in a gravity direction is defined as "bottom", and the opposite side (upstream side) is defined as "top".

1. Configuration of a Work Vehicle

Figure 1:
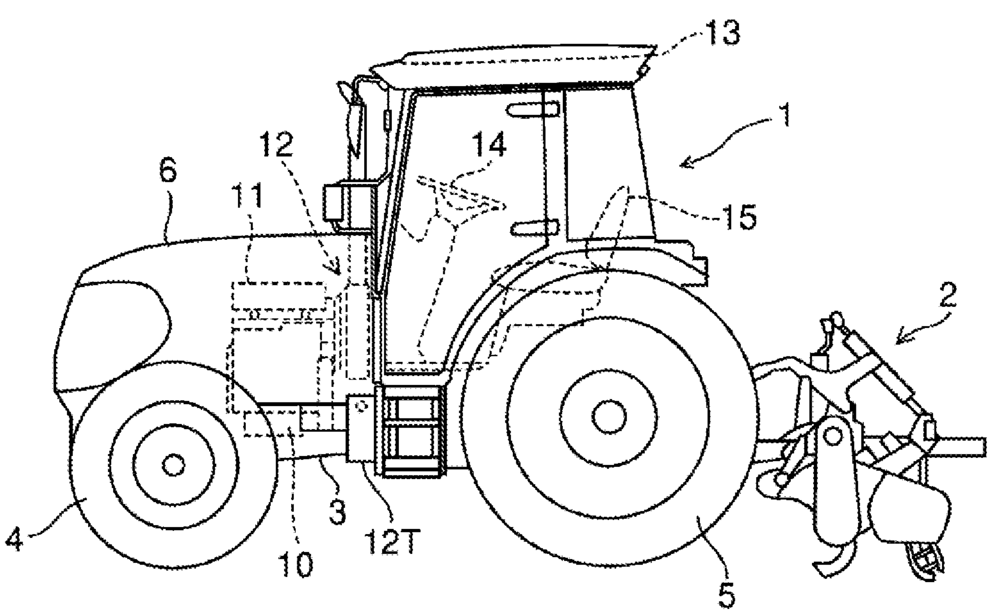
FIG. 1 is an explanatory diagram illustrating a schematic configuration of a tractor according to one embodiment of the present invention.

FIG. 1 is an explanatory diagram illustrating a schematic configuration of a tractor 1 according to the present embodiment. The tractor 1 is provided with a vehicle body 3 of which a work machine 2 can be mounted on a rear side of the tractor 1. A pair of left and right front wheels 4 are attached to a front section of the vehicle body 3. A pair of left and right rear wheels 5 are attached to a rear section of the vehicle body 3. A hood 6 is disposed in the front section of the vehicle body 3. An engine 10 (diesel engine) as a drive source is housed in the hood 6.

A DPF (Diesel Particulate Filter) system 11 is installed on an upper side of the engine 10. The DPF system 11 is a system which collects particulate materials (PM: Particulate Matter) contained in an exhaust gas discharged from the engine 10. There is provided on a rear side of the engine 10 an SCR (Selective Catalytic Reduction) system 12. The SCR system 12 is a system for adding urea water (reducing agent) stored in a urea water storage tank (reductant storage tank) 12T to exhaust gas discharged from the engine 10 via the DPF system 11 to reduce nitrogen oxides (NOx) contained in the exhaust gas. It is noted that details related to the DPF system 11 and the SCR system 12 are described later.

There is provided at a rear side of the hood 6 a cabin 13 in which a user gets. There are provided in the cabin 13 a steering wheel 14 for the user to steer and a driver's seat 15 for the user. A display unit (not illustrated) is also provided in the cabin 13 for the user seated in the driver's seat 15 to see information on the tractor 1.

Figure 2:
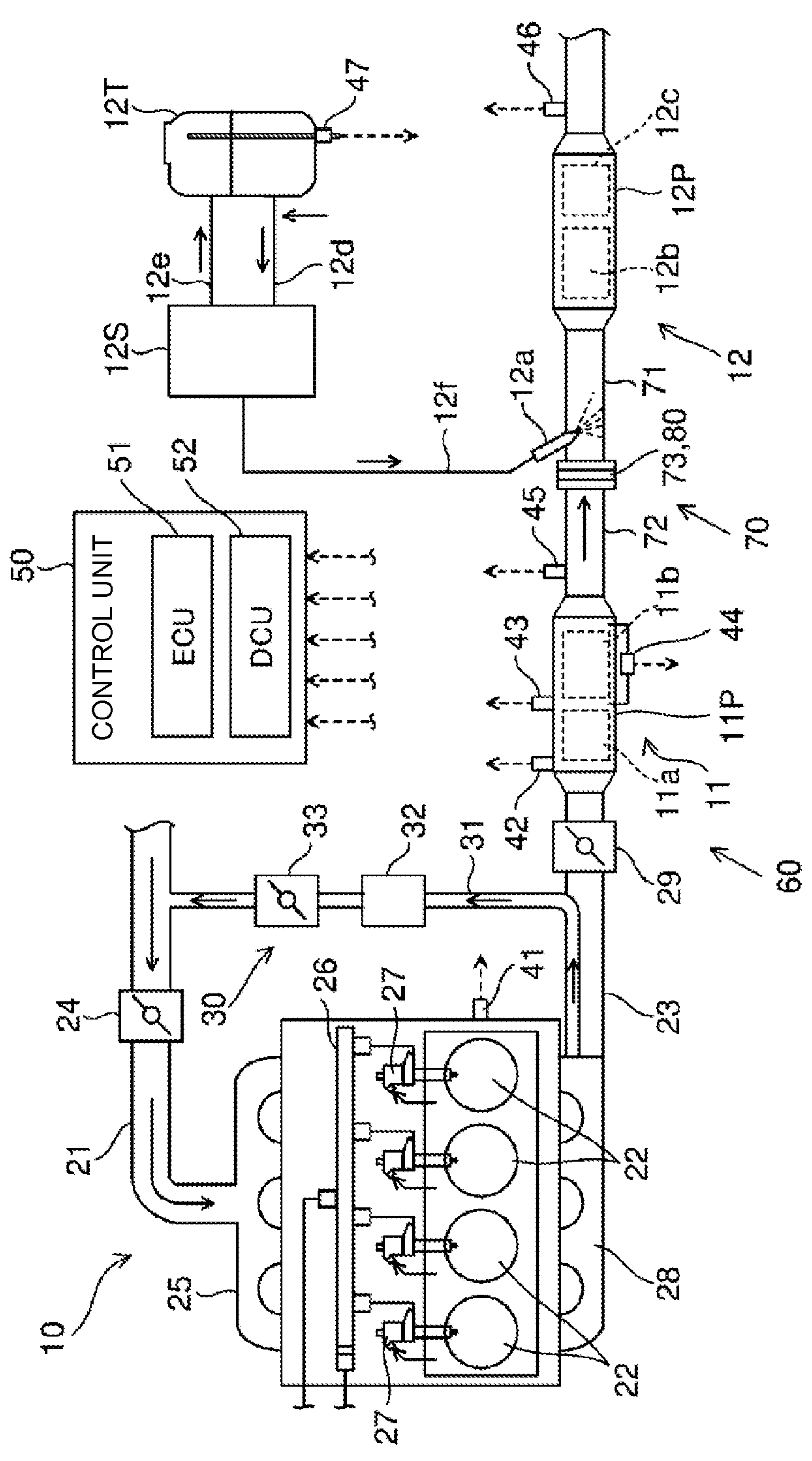
FIG. 2 is an explanatory diagram schematically illustrating an intake system and an exhaust system of an engine provided in the above-mentioned tractor.

FIG. 2 is an explanatory diagram schematically illustrating an intake system and an exhaust system of the engine 10. The engine 10 has provided therein an air intake passage 21 for intaking air from the outside, a combustion chamber 22 for burning fuel, and an exhaust passage 23 for discharging exhaust gas from the combustion chamber 22 to the outside. Incidentally, FIG. 2 illustrates a four-cylinder engine 10 with four combustion chambers 22, and the number of the combustion chambers 22 can be changed as needed.

In the air intake passage 21, an intake valve 24 and an intake manifold 25 are disposed in order from an upstream side in an air flow direction thereof. The intake valve 24 is configured so as to be able to adjust the amount of air supplied to the combustion chambers 22. The intake manifold 25 is configured so as to distribute and supply intake air to each of a plurality of combustion chambers 22.

The engine 10 is provided with a common rail 26 and an injector 27 for supplying fuel to the combustion chamber 22. Fuel is pumped to the common rail 26 by a fuel pump (not illustrated). The injector 27, which is disposed in each of the combustion chambers 22, injects fuel stored at a high pressure in the common rail 26 into each of the combustion chambers 22 at a predetermined timing.

In the exhaust passage 23, an exhaust manifold 28, an exhaust valve 29, the above-mentioned DPF system 11 and the SCR system 12 are disposed in order from an upstream side in a flow direction of exhaust gas.

The exhaust manifold 28 is configured to collectively discharge exhaust gas generated in each of the combustion chambers 22. The exhaust valve 29 is configured so as to be able to adjust the discharge amount of exhaust gas to be discharged outside the engine 10.

The engine 10 is further provided with an EGR (Exhaust Gas Recirculation) device 30. The EGR device 30 is an exhaust gas recirculation device that causes a portion of exhaust gas discharged from the exhaust manifold 28 to recirculate to an intake side. Specifically, the EGR device 30 is provided with an EGR flow passage 31 that causes a portion of exhaust gas from the exhaust passage 23 to recirculate to the air intake passage 21. In the EGR flow passage 31, an EGR cooler 32 and an EGR valve 33 are disposed in order from an upstream side in the flow direction of the exhaust gas. The EGR cooler 32 cools the recirculating exhaust gas. The EGR valve 33 is a valve for adjusting the recirculation amount of the exhaust gas.

The EGR device 30 causes a portion of the exhaust gas to recirculate to the intake side, thereby reducing the amount of oxygen in the inhaled gas. This allows combustion temperature to be lowered, thus being capable of reducing generation of nitrogen oxides that are known as NOx.

The DPF system 11 is provided with an oxidation catalyst 11*a* and a soot filter 11*b* in order from an upstream side in the flow direction of the exhaust gas. The oxidation catalyst 11*a* and the soot filter 11*b* are housed in a DPF case 11P.

The oxidation catalyst 11*a* is configured so as to promote oxidation of carbon monoxide, nitric oxide, and the like contained in the exhaust gas. The Soot filter 11*b* is configured so as to collect PM such as soot contained in the exhaust gas. The PM that has been collected and deposited by the soot filter 11*b* is combusted and removed by implementing a DPF regeneration control at an appropriate timing.

The SCR system 12 has therein provided a urea water injection device 12*a*, a selective reduction catalyst (SCR) 12*b*, and an ammonia slip suppression catalyst (ASC) 12*c* in order from an upstream in a flow direction of the exhaust gas. The selective reduction catalyst 12*b* and the ammonia slip suppression catalyst 12C are housed in a hollow SCR case 12P.

The urea water injection device 12*a*, for example, comprises a urea solution injection nozzle and is a module (DM: Dosing Module) that injects urea water supplied by the urea water supply device 12S (described below) to add it to the exhaust gas supplied from the DPF system 11. The selective reduction catalyst 12*b* is constituted so as to selectively reduce NOx contained in exhaust gas under an atmosphere where ammonia (NH3) incorporated into the exhaust gas from urea water is present.

The ammonia slip suppression catalyst 12*c* comprises an oxidation catalyst such as platinum, and is configured so as to oxidize ammonia that has unexpectedly passed through the selective reduction catalyst 12*b*. Ammonia is oxidized to nitrogen, nitric oxide, water, or the like, thereby preventing release of the ammonia to the outside.

The SCR system 12 is further provided with the urea water storage tank 12T and the urea water supply device 12S. The urea water storage tank 12T is a tank that stores the above-mentioned urea water as a reducing agent. The urea water supply device 12S comprises a pump. The urea water supply device 12S sucks urea water via a urea water extraction passage 12*d* from the urea water storage tank 12T, and supplies the urea water to the urea water injection device 12*a* via the urea water supply passage 12*f*. A portion of the urea water sucked by the urea water supply device 12S is returned to the urea water storage tank 12T via a urea water return passage 12*e*.

The tractor 1 is further provided with various kinds of sensors. The above-mentioned sensor includes, for example, an engine rotational speed sensor 41, an oxidation catalyst temperature sensor 42, a soot filter temperature sensor 43, and a differential pressure sensor 44. The engine rotational speed sensor 41 detects rotational speed of the engine 10. The oxidation catalyst temperature sensor 42 detects temperature at an upstream side of the oxidation catalyst 11*a* in the DPF system 11. The soot filter temperature sensor 43 detects temperature at an upstream side of the soot filter 11*b* in the DPF system 11. The differential pressure sensor 44 detects a differential pressure between the upstream side and the downstream side of the soot filter 11*b* in the DPF system 11.

The above-mentioned sensor also includes, for example, an upstream side NOx sensor 45, a downstream side NOx sensor 46, a urea water residual amount sensor 47, and a urea water supply pressure sensor (not illustrated). The upstream side NOx sensor 45 is disposed at an upstream side of the selective reduction catalyst 12*b* in the SCR system 12 (more precisely, at an upstream side of the urea water injection device 12*a*) and detects concentration of NOx contained in exhaust gas at the downstream side of the soot filter 11*b* in the DPF system 11. The downstream side NOx sensor 46 detects concentration of NOx contained in exhaust gas at a downstream side of the ammonia slip suppression catalyst 12*c* in the SCR system 12. The urea water residual amount sensor 47 detects the residual amount of the urea water stored in the urea water storage tank 12T of the SCR system 12. The urea water supply pressure sensor detects supply pressure of urea water to the urea water injection device 12*a* of the SCR system 12.

The tractor 1 is further provided with a control unit 50. The control unit 50 includes an ECU (Engine Control Unit) 51 and a DCU (Dosing Control Unit) 52. The ECU 51 mainly controls an output state of the engine 10, the DPF system 11, and the like. The DCU 52 controls the SCR system 12.

The control unit 50 controls the supply amount of air by the intake valve 24, the discharge amount by the exhaust valve 29, the fuel injection timing and fuel injection amount by the injector 27, the recirculation amount by the EGR valve 33, and the like so as to bring an output state of the engine 10 into a predetermined output state using detection information of the above-mentioned various kinds of sensor, a preset map and the like. For example, the control unit 50 controls the above-mentioned supply amount of air, the above-mentioned discharge amount, the above-mentioned fuel injection timing, the above-mentioned fuel injection amount, the above-mentioned recirculation amount, and the like so as to bring the engine rotational speed detected by the engine rotational speed sensor 41 into a predetermined engine rotational speed.

In addition, the control unit 50 also controls the injection amount of urea water injected from the urea water injection device 12*a* so as to bring a removal ratio of NOx into a predetermined NOx removal ratio using detection information from various kinds of sensors. For example, the control unit 50 estimates the amount of ammonia required to reduce NOx by the selective reduction catalyst 12*b* on the basis of NOx concentration at the upstream side of the selective reduction catalyst 12*b* detected by the upstream side NOx sensor 45, and controls the injection amount of urea water injected from the urea water injection device 12*a*. In addition, the control unit 50 estimates the rate of NOx reduced by the selective reduction catalyst 12*b* on the basis of NOx concentration at the downstream side of the selective reduction catalyst 12*b* detected by the downstream side NOx sensor 46, and performs feedback correction on the injection amount of urea water determined from detection values detected by the upstream side NOx sensor 45 so as to bring a removal rate of NOx into a predetermined NOx removal ratio.

2. Exhaust Gas Purification System

Figure 3:
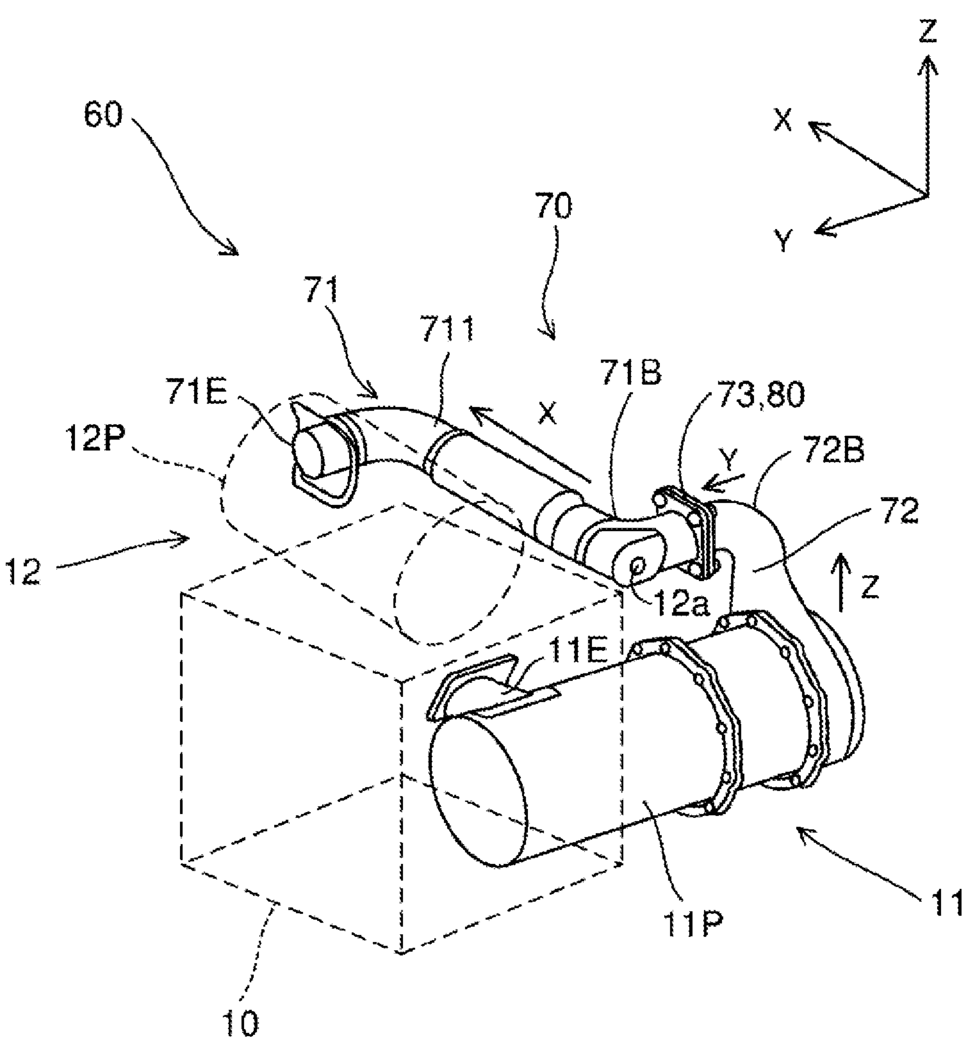
FIG. 3 is a perspective diagram schematically illustrating an exhaust gas purification system disposed in the above-mentioned exhaust system.

The tractor 1 as a work vehicle according to the present embodiment is provided with an exhaust gas purification system 60. FIG. 3 is a perspective diagram schematically illustrating the 60 exhaust gas purification system. It is noted that in FIG. 3, three directions that are mutually perpendicular are defined as an X direction, a Y direction, and a Z direction for convenience. Each of the XYZ directions indicates a direction in which exhaust gas flows, but does not necessarily coincides with each of front and rear, left and right, and up and down directions.

The exhaust gas purification system 60 is a system that purifies exhaust gas discharged from the engine 10. The exhaust gas purification system 60 comprises an exhaust gas rectifier 70 including the above-mentioned DPF system 11 and the SCR system 12 including the urea water injection device 12*a*.

The exhaust gas rectifier 70 is disposed at a downstream side of the DPF system 11 in the direction in which exhaust gas flows. In other words, the DPF system 11 is disposed at an upstream side of the exhaust gas rectifier 70. An exhaust gas inlet 11E of the DPF case 11P in the DPF system 11 is connected to the exhaust passage 23 (refer to FIG. 2) through which the exhaust gas discharged from the engine 10 passes.

In addition, the exhaust gas rectifier 70 is disposed at an upstream side of the SCR case 12P in the SCR system 12 in the direction in which exhaust gas flows. The exhaust gas inlet of the SCR case 12P is connected to the exhaust gas outlet 71E of a first exhaust gas piping 71, which will be described below in the exhaust gas rectifier 70. Details with regard to the exhaust gas rectifier 70 are described later.

Figure 4:
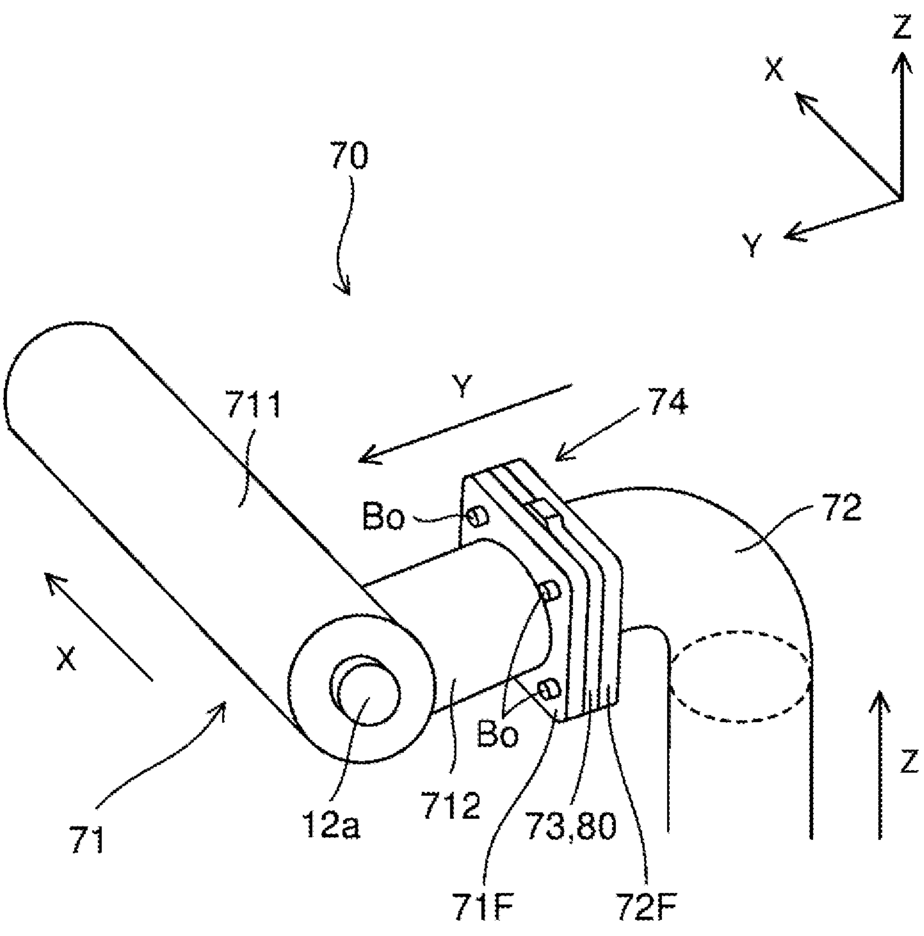
FIG. 4 is a perspective diagram schematically illustrating a configuration example of an exhaust gas rectifier provided in the above-mentioned exhaust gas purification system.

FIG. 4 is a perspective diagram schematically illustrating a configuration example of the exhaust gas rectifier 70 illustrated in FIG. 2 and FIG. 3. The exhaust gas rectifier 70 comprises a first exhaust gas piping 71, a second exhaust gas piping 72, and an exhaust gas deflector 73. The above-mentioned urea water injection device 12*a* is attached to the first exhaust gas piping 71. Shapes of the first exhaust gas piping 71 and the second exhaust gas piping 72 shown below are merely examples, and are not limited to the following examples.

The first exhaust gas piping 71 comprises a first flow passage pipe 711 and a second flow passage pipe 712. The first flow passage pipe 711 is disposed extending in the X direction. An end part at a downstream side in the X direction in the first flow passage pipe 711 is connected to the SCR case 12P in the SCR system 12 (refer to FIG. 2). The second flow passage pipe 712 is disposed extending in the Y direction and is coupled to an outer peripheral surface of the first flow passage pipe 711 by welding or other means. A coupling part between the first flow passage pipe 711 and the second flow passage pipe 712 constitutes a first bending part 71B (refer to FIG. 3) described below, which bends a traveling direction of exhaust gas. The interiors of the first flow passage pipe 711 and the second flow passage pipe 712 constitute a communication passage through which exhaust gas flows.

The urea water injection device 12*a* is attached to an end surface at an upstream side in the X direction in the first flow passage pipe 711 and injects urea water into exhaust gas flowing from the second flow passage pipe 712 into the first flow passage pipe 711. The urea water injection device 12*a* is mounted on the end face of the first flow passage pipe 711 so that urea water can be injected at a predetermined angle.

The second exhaust gas piping 72 is located at an upstream side of the first exhaust gas piping 71 in a direction in which exhaust gas flows (Y direction in FIG. 4). More specifically, the second exhaust gas piping 72 is located at an upstream side in the Y direction from the second flow passage pipe 712 of the first exhaust gas piping 71. The second exhaust gas piping 72 is formed by bending from the Z direction to the Y direction. The bending part in the second exhaust gas piping 72 constitutes the second bending part 72B (refer to FIG. 3) described below. An end part at an upstream side of the second exhaust gas piping 72 in the Z direction is connected to the DPF case 11P of the DPF system 11 (refer to FIGS. 2 and 3).

The exhaust gas deflector 73 is located at an upstream side with respect to the second flow passage pipe 712 of the first exhaust gas piping 71 in the Y direction. In other words, the exhaust gas deflector 73 is located at an upstream side with respect to the urea water injection device 12*a* in a direction in which exhaust gas flows. The exhaust gas deflector 73 is located at a downstream side with respect to the second exhaust gas piping 72 in the Y direction. According to the present embodiment, the exhaust gas deflector 73 includes a plate-shaped exhaust gas deflector plate 80. The exhaust gas deflector plate 80 has an opening part through which exhaust gases passes. Details with regard to the exhaust gas deflector plate 80 are described later. The exhaust gas deflector plate 80 is located at a connection part 74 that connects the first exhaust gas piping 71 with the second exhaust gas piping 72. More details are as follows.

Figure 5:
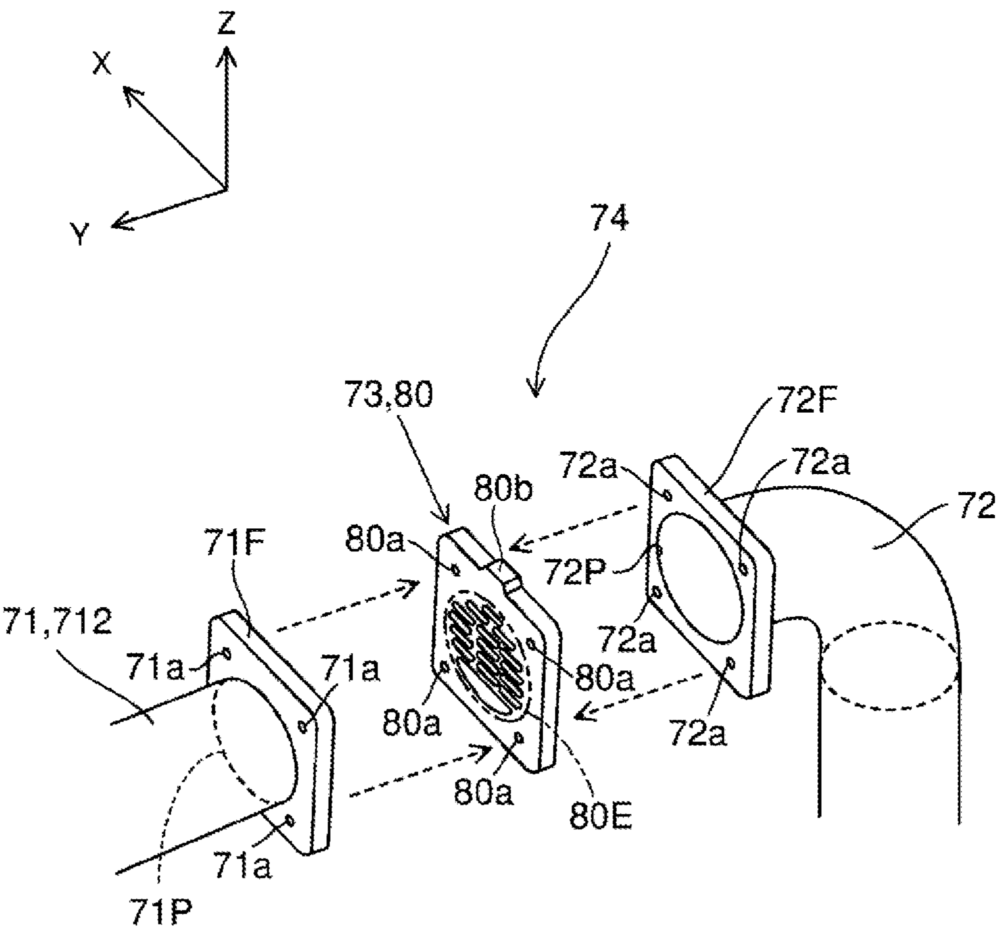
FIG. 5 is an exploded perspective diagram of a connection part provided in the above-mentioned exhaust gas rectifier.

FIG. 5 is an exploded perspective diagram of a connection part 74. The connection part 74 includes a first flange part 71F provided in the first exhaust gas piping 71 and a second flange part 72F provided in the second exhaust gas piping 72. The first flange part 71F is disposed at an end part at an upstream side of the second flow passage pipe 712 of the first exhaust gas piping 71 in the Y direction. The second flange part 72F is disposed at an end part at a downstream side of the second exhaust gas piping 72 in the Y direction. The first flange part 71F and the second flange part 72F are fastened by fastening members such as bolts Bo (refer to FIG. 4) and nuts (not illustrated). The exhaust gas deflector plate 80, which is positioned between the first flange part 71F and the second flange part 72F, is attached between the first flange part 71F and the second flange part 72F by fastening the first flange part 71F and the second flange part 72F with the above-mentioned fastening members.

The first flange part 71F has a first passage part 71P, which is an opening through which exhaust gas passes. The inner diameter of the first passage part 71P is the same as that of the first exhaust gas piping 71 (in particular, the second flow passage pipe 712). The first flange part 71F has a first hole part 71*a* at each of four corners thereof. The bolt Bo as a fastening member is inserted into each of the first hole parts 71*a*.

The second flange part 72F has a second passage part 72P, which is an opening through which exhaust gas passes. The inner diameter of the second passage part 72P is the same as that of the second exhaust gas piping 72. The second flange part 72F also has a second hole part 72*a* at each of the four corners thereof. The bolt Bo as a fastening member is inserted into each of the second hole parts 72*a*.

The exhaust gas deflector plate 80 has a third hole part 80*a* at each of the four corners thereof. The bolt Bo as a fastening member is inserted into each of the third hole parts 80*a*. Each bolt Bo is inserted into the corresponding first hole part 71*a*, the corresponding third hole part 80*a*, and the corresponding second hole part 72*a*, and the tip of each bolt Bo is inserted into the nut and tightened, thereby connecting the first exhaust gas piping 71 and the second exhaust gas piping 72 through the exhaust gas deflector plate 80. Fastening of the bolts Bo and nuts is released to disassemble the first exhaust gas piping 71, the second exhaust gas piping 72, and the exhaust gas deflector plate 80. That is to say, the connection part 74 can be disassembled.

According to a configuration of the above-mentioned exhaust gas rectifier 70, exhaust gas that is discharged from the DPF system 11 and flows inside the second exhaust gas piping 72 is redirected from the Z direction to the Y direction by the second exhaust gas piping 72 and flows into the first exhaust gas piping 71 through an opening part of the exhaust gas deflector 73. In the first exhaust gas piping 71, urea water is injected from the urea water injection device 12*a* illustrated in FIG. 4 and added to the above-mentioned exhaust gas. After the urea water is added, the exhaust gas travels in the X direction in the first exhaust gas piping 71 and is introduced into the SCR system 12 (refer to FIG. 2).

From the viewpoint of facilitating attachment and removal of the exhaust gas deflector plate 80, it is preferable that the exhaust gas deflector plate 80 should be located at the connection part 74 that connects the first exhaust gas piping 71 and the second exhaust gas piping 72. In particular, a configuration in which the exhaust gas deflector plate 80 is located at the connection part 74 is desirable in that it is easier to replace with a desired exhaust gas deflector plate 80 in accordance with a shape (for example, bend) and a size (for example, inner diameter) of the first exhaust gas piping 71 and the second exhaust gas piping 72.

From the viewpoint of facilitating replacement of the exhaust gas deflector plate 80 while ensuring a sealing property between the first flange part 71F and the second flange part 72F, it is preferable that the exhaust gas deflector plate 80 should be mounted between the first flange part 71F and the second flange part 72F.

As illustrated in FIG. 3, the first exhaust gas piping 71 has a first bending part 71B. The second exhaust gas piping 72 has a second bending part 72B. Each of the first bending part 71B and the second bending part 72B bends a flow passage through which exhaust gas flows. In this embodiment, the first bending part 71B has a shape that bends from the Y direction to the X direction and bends from the Y direction to the X direction the flow passage through which the exhaust gas flows. The above-mentioned urea water injection device 12A is mounted on the first bending part 71B. The second bending part 72B has a shape that bends from the Z direction to the Y direction and bends from the Z direction to the Y direction the flow passage through which the exhaust gas flows.

From the viewpoint of effectively utilizing a space between the first bending part 71B and the second bending part 72B, it is preferable that the exhaust gas deflector 73 (exhaust gas deflector plate 80) should be disposed between the first bending part 71B and the second bending part 72B.

In particular, from the viewpoint of facilitating demonstration of the function and action of the exhaust gas deflector 73 that generates a swirling flow described below at a downstream side of the first bending part 71B, it is preferable that the exhaust gas deflector 73 should be disposed closer to the first bending part 71B than the center between the first bending part 71B (in particular, at the exhaust gas inlet) and the second bending part 72B (in particular, at the exhaust gas outlet). That is to say, it is desirable that the exhaust gas deflector 73 should be placed between the first bending part 71B and the second bending part 72B and disposed at a position where a distance from the first bending part 71B to the exhaust gas deflector 73 is shorter than a distance from the second bending part 72B to the exhaust gas deflector 73.

3. Details of an Exhaust Gas Deflector Plate

Figure 6:
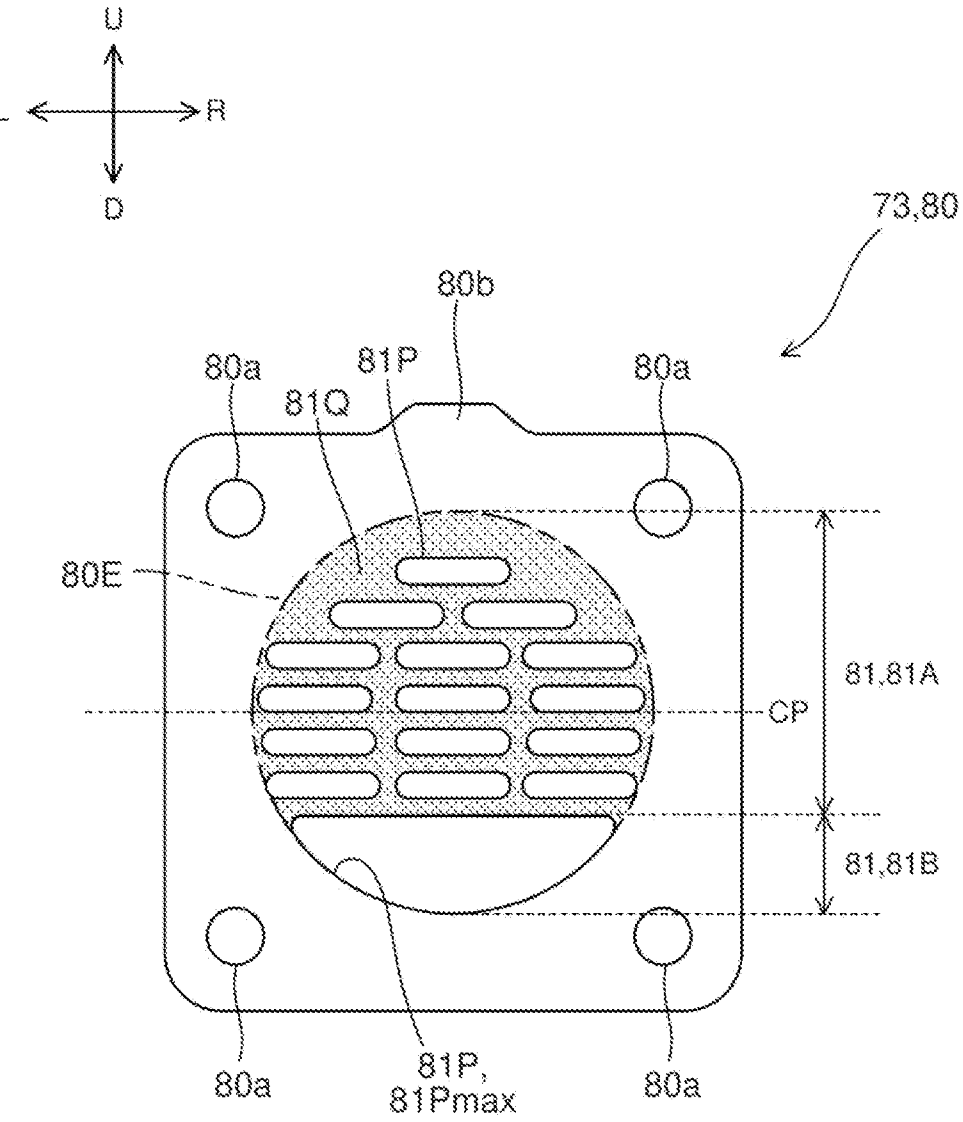
FIG. 6 is a front diagram of an exhaust gas deflector plate, which is one example of an exhaust gas deflector provided in the above-mentioned exhaust gas rectifier.

FIG. 6 is a front diagram when the exhaust gas deflector plate 80 illustrated in FIG. 4 and FIG. 5 is viewed from the Y direction. It is noted that the direction is defined as follows for convenience in a case where the exhaust gas deflector plate 80 is described. That is to say, the Z direction illustrated in FIG. 4 and FIG. 5 is defined as an up and down direction, and the X direction is defined as a left and right direction. A downstream side in the Z direction is defined as an upstream side in the gravity direction, which is an up side, and an upstream side in the Z direction is defined as a downstream side in the gravity direction, which is a down side. In addition, an upstream side in the X direction is defined as a right side, and a downstream side in the X direction is defined as a left side. In each figure, symbols represent "U" for an up direction, "D" for a down direction, "R" for a right direction, and "L" for a left direction as appropriate.

In FIG. 6 and the like, an outer shape of the region in the exhaust gas deflector plate 80 that is connected to the first exhaust gas piping 71 (in particular, the first passage part 71P of the first flange part 71F) and the second exhaust gas piping 72 (in particular, the second passage part 72P of the second flange part 72F) is shown as a passage outer peripheral part 80E. It is noted that the inner diameter of the passage outer peripheral part 80E is equal to that of the first exhaust gas piping 71 (in particular, the first passage part 71P) and the second exhaust gas piping 72 (in particular, the second passage part 72P).

The exhaust gas deflector plate 80 has a convex part 80*b*. The convex part 80*b* is located at an upper portion of an outer periphery of the exhaust gas deflector plate 80. According to the present embodiment, as illustrated in FIG. 4, the second exhaust gas piping 72 is shaped so as to supply, to the first exhaust gas piping, 71 exhaust gas flowing from bottom to top, and therefore, the exhaust gas deflector plate 80 is arranged in a direction where the convex part 80*b* protrudes upward. For example, in a case where the second exhaust gas piping 72 is shaped so as to supply, to the first exhaust gas piping, 71 exhaust gas flowing from top to bottom, the exhaust gas deflector plate 80 may be arranged in a direction where the convex part 80*b* protrudes downward (rotated by 180° in the Y direction set as a central axis from the position of FIG. 4).

The exhaust gas deflector plate 80 as the exhaust gas deflector 73 includes a plurality of individual regions 81. The plurality of the individual regions 81 include a first individual region 81A and a second individual region 81B. The first individual region 81A and the second individual region 81B are arranged in the Z direction (in this case, up and down direction). In other words, the plurality of the individual regions 81 are arranged in one direction. Specifically, the first individual region 81A is located at an upper side of the second individual region 81B.

Each of the plurality of the individual regions 81 has an opening part 81P. The opening part 81P is an opening part through which exhaust gas passes. The number of the opening parts 81P that each of the individual regions 81 has is not specifically limited, and may be one or more. In an example in FIG. 6, the first individual region 81A has a plurality of the opening parts 81P. The plurality of the opening parts 81P that is provided in the first individual region 81A are all identical in shape with long holes in a left and right direction. On the other hand, the second individual region 81B has only one opening part 81P in the example in FIG. 6. The opening part 81P that is provided in the second individual region 81B is plano-convex in shape whose a top side is flat and a bottom side is convex. The opening part 81P that is provided in the second individual region 81B has the largest opening area among all the opening parts 81P. In the following, the opening part 81P that has the largest opening area may be particularly referred to as an opening part 81Pmax.

At least any one of the plurality of the individual regions 81 has a peripheral region 81Q. The peripheral region 81Q is a region that is disposed inside of the passage outer peripheral part 80E and around the opening part 81P with respect to each individual region 81. It is noted that in FIG. 6, the peripheral region 81Q is indicated by hatching for the purpose of clarifying the peripheral region 81Q (the same is applied to the following figures). In addition, depending on a shape of the individual region 81 (the shape and number of the opening parts 81P), there may be an individual region 81 without the peripheral region 81Q. For example, the second individual region 81B can be an individual region 81 without a peripheral region 81Q by forming the entire region with the opening part 81Pmax.

In the present embodiment, opening ratios of the plurality of the individual regions 81 are different in the above-mentioned one direction. Here, the above-mentioned opening ratio is defined as follows. That is to say, when the entire area of one individual region 81 is A ($cm^2$) and the total of the opening area of at least one of the opening parts 81P in the above-mentioned individual region 81 is B ($cm^2$), the opening ratio AR (%) of the above-mentioned individual region 81 is represented by the following formula.

$$AR=(B/A)\times 100$$

The area of the peripheral region 81Q in one of the individual regions 81 is C ($cm^2$), which leads to A=B+C. Thus, for example, the individual region 81 without peripheral region 81Q has C=0, which leads to A=B.

The opening ratio of the first individual region 81A is AR1(%) and that of the second individual region 81B is AR2(%), which leads to AR1<AR2 in this embodiment.

Figure 7:
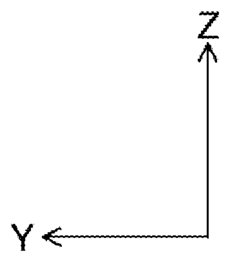
FIG. 7 is an explanatory diagram schematically illustrating a flow of exhaust gas in first exhaust gas piping provided in the above-mentioned exhaust gas rectifier.
Figure 7:
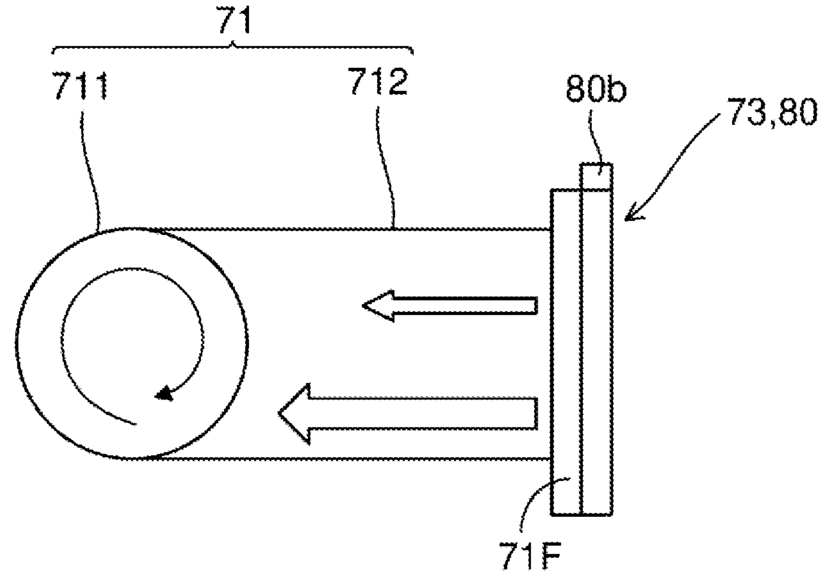
Figure 8:
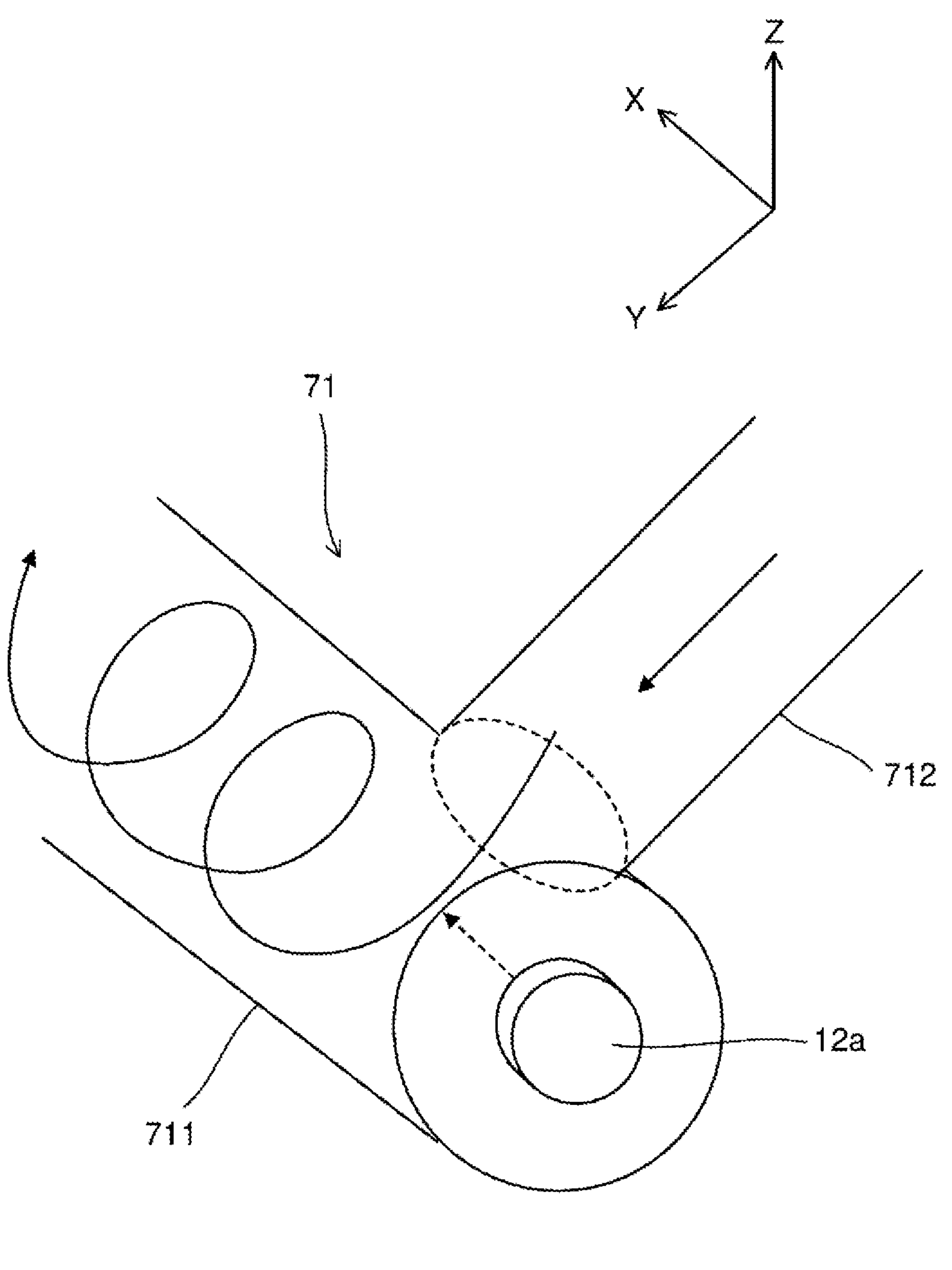
FIG. 8 is an explanatory diagram schematically illustrating a flow of exhaust gas in the above-mentioned first exhaust gas piping.
Figure 9:
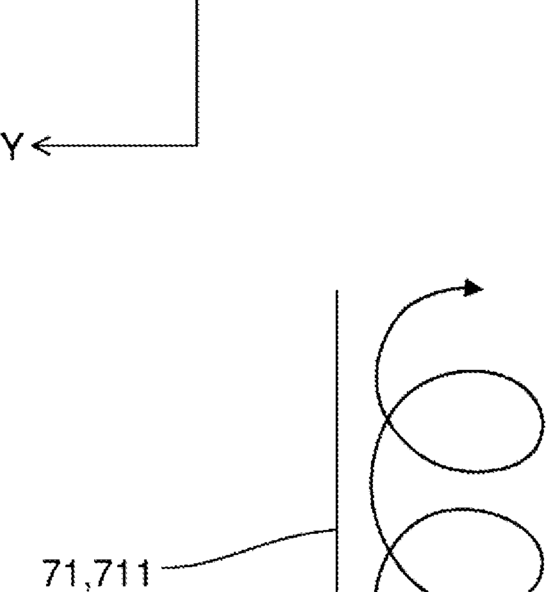
FIG. 9 is an explanatory diagram schematically illustrating a flow of exhaust gas in the above-mentioned first exhaust gas piping.

FIG. 7 through FIG. 9 schematically illustrates an exhaust gas flow in the first exhaust gas piping 71. As in the present embodiment, if the exhaust gas deflector plate 80 as the exhaust gas deflector 73 is positioned at the connection part 74 that connects the first exhaust gas piping 71 and the second exhaust gas piping 72 so that the first individual region 81A, which has a relatively small opening ratio, is at an up side (at an upstream side in the gravity direction) and the second individual region 81B, which has a relatively large opening ratio, is at a down side (at a downstream side in the gravity direction), more exhaust gas that passes through the exhaust gas deflector plate 80 flows on the down side compared to on the up side, as illustrated in FIG. 7. Thus, as illustrated in FIG. 8 and FIG. 9, when the above-mentioned exhaust gas is supplied to the downstream side of the urea water injection device 12*a* (first flow passage pipe 711) and urea water is injected from the urea water injection device 12*a* to the above-mentioned exhaust gas, a flow (swirling flow) that swirls from bottom to top can be easily generated at the downstream side of the urea water injection device 12*a*.

Figure 10:
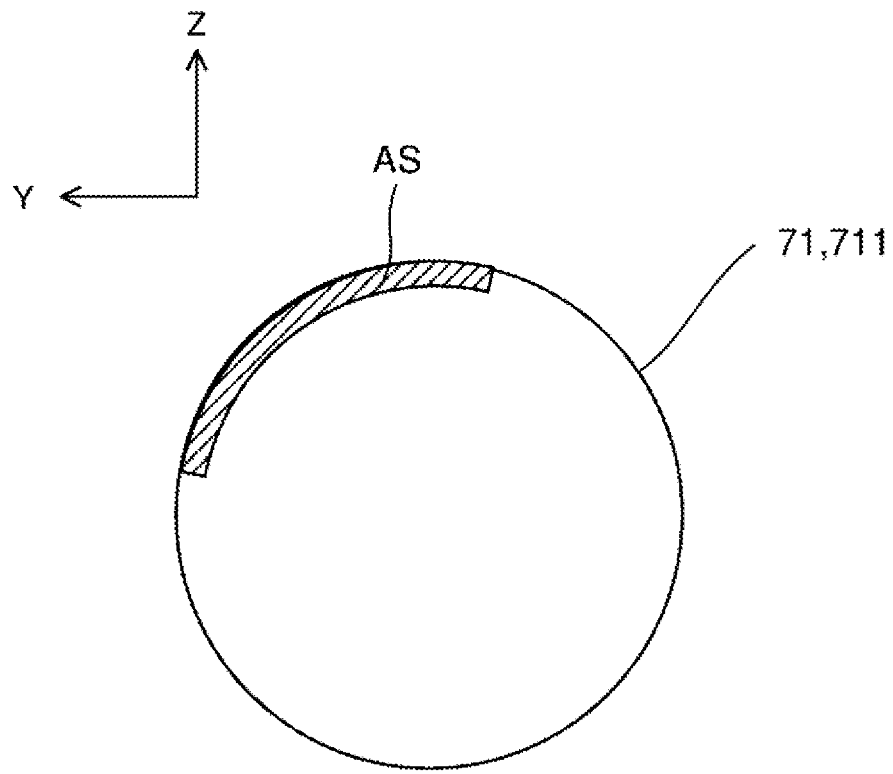
FIG. 10 is an explanatory diagram schematically illustrating a distribution of urea water adhering to an inner surface of the above-mentioned first exhaust gas piping.
Figure 11:
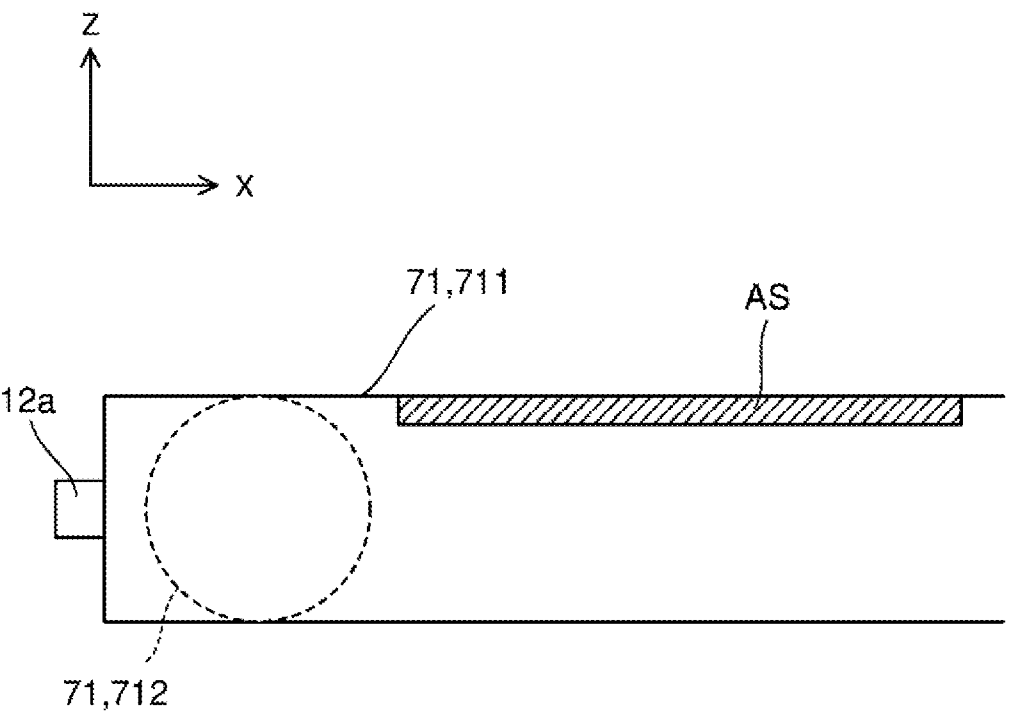
FIG. 11 is an explanatory diagram schematically illustrating a distribution of urea water adhering to an inner surface of the above-mentioned first exhaust gas piping.

Due to generation of the above-mentioned swirling flow, the urea water that is injected from the urea water injection device 12*a* adheres to an upper portion of an inner surface of the first exhaust gas piping 71 (in particular, the first flow passage pipe 711) against downward gravity. In addition, the injected urea water is widely diffused by the above-mentioned swirling flow in the first exhaust gas piping 71 in the X direction and adheres to a wide area in the X direction. FIG. 10 and FIG. 11 schematically illustrate distribution of urea water AS that adheres to the inner surface of the first exhaust gas piping 71 (in particular, the first flow passage pipe 711). Thus, local adhesion of the urea water in the first exhaust gas piping 71 is reduced, thereby being capable of reducing a risk of occurrence of solids (deposits) originated from urea in the first exhaust gas piping 71.

Figure 12:
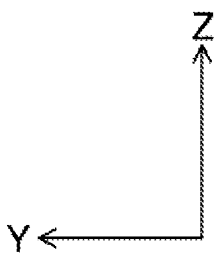
FIG. 12 is an explanatory diagram schematically illustrating a flow of exhaust gas in the above-mentioned first exhaust gas piping in a case where the above-mentioned exhaust gas deflector plate is not disposed in the above-mentioned connection part (comparative example).
Figure 12:
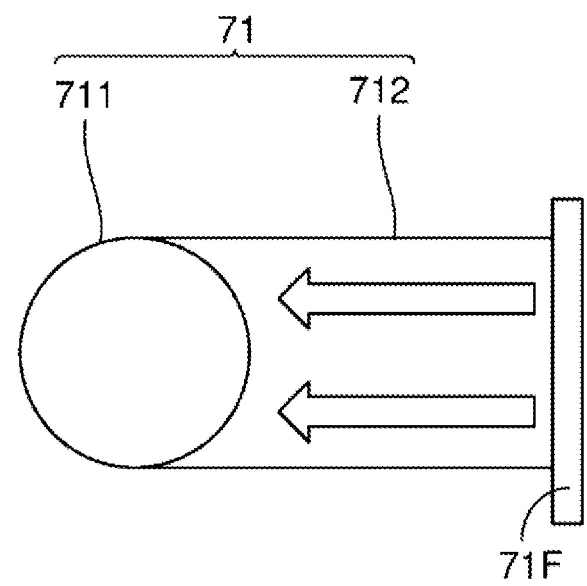
Figure 13:
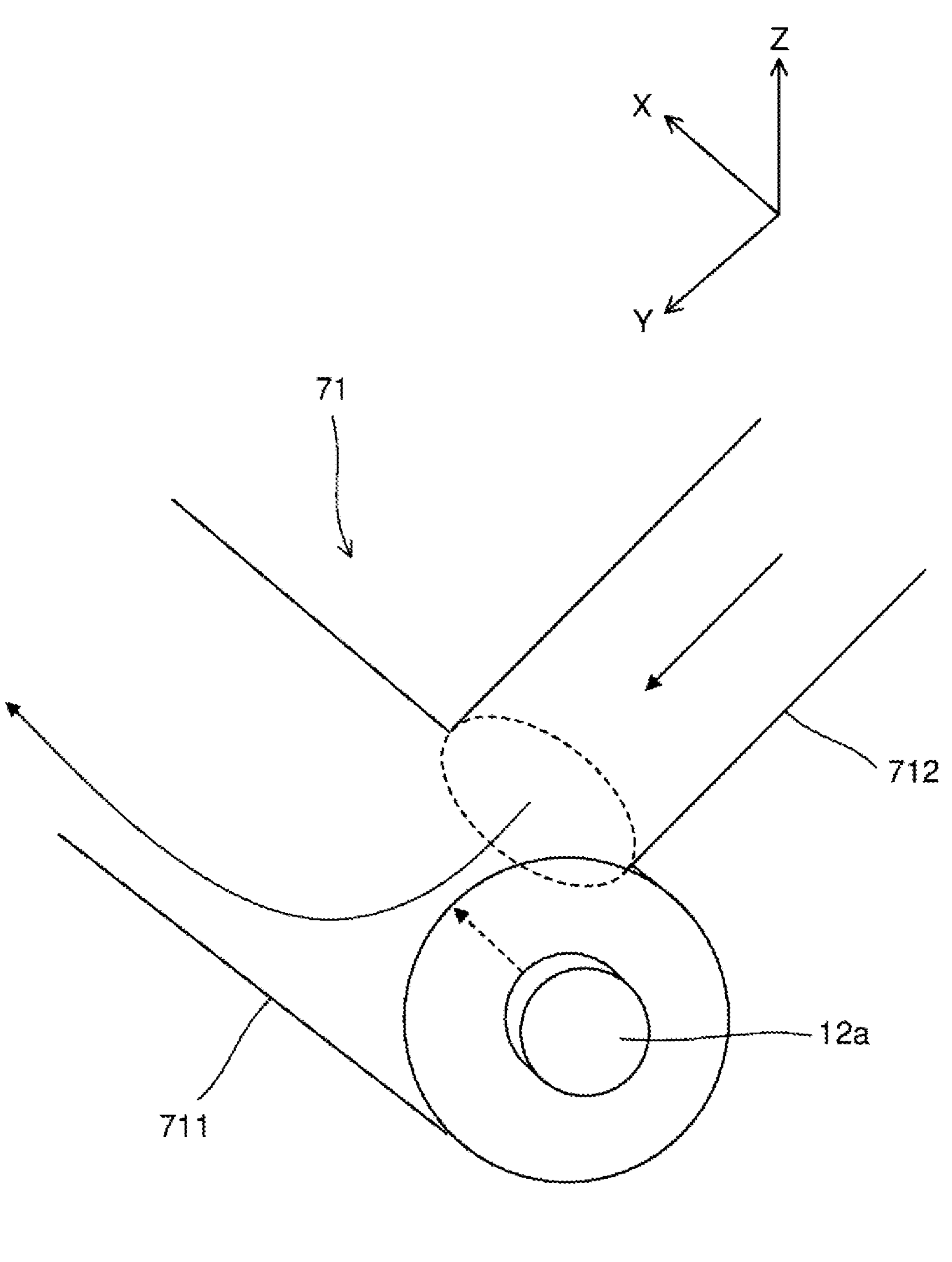
FIG. 13 is an explanatory diagram schematically illustrating a flow of exhaust gas in the above-mentioned first exhaust gas piping in the above-mentioned comparative example.
Figure 14:
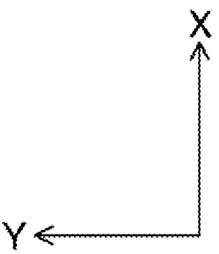
FIG. 14 is an explanatory diagram schematically illustrating a flow of exhaust gas in the above-mentioned first exhaust gas piping in the above-mentioned comparative example.
Figure 14:
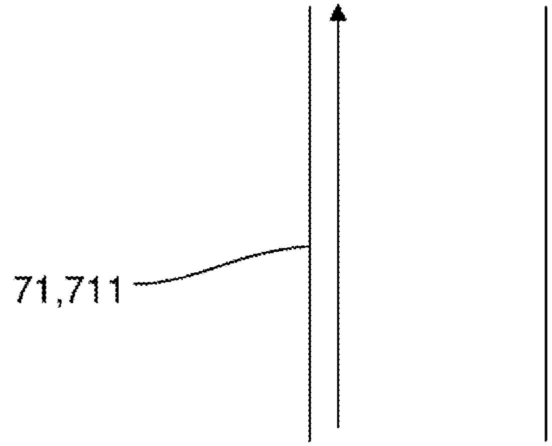
Figure 15:
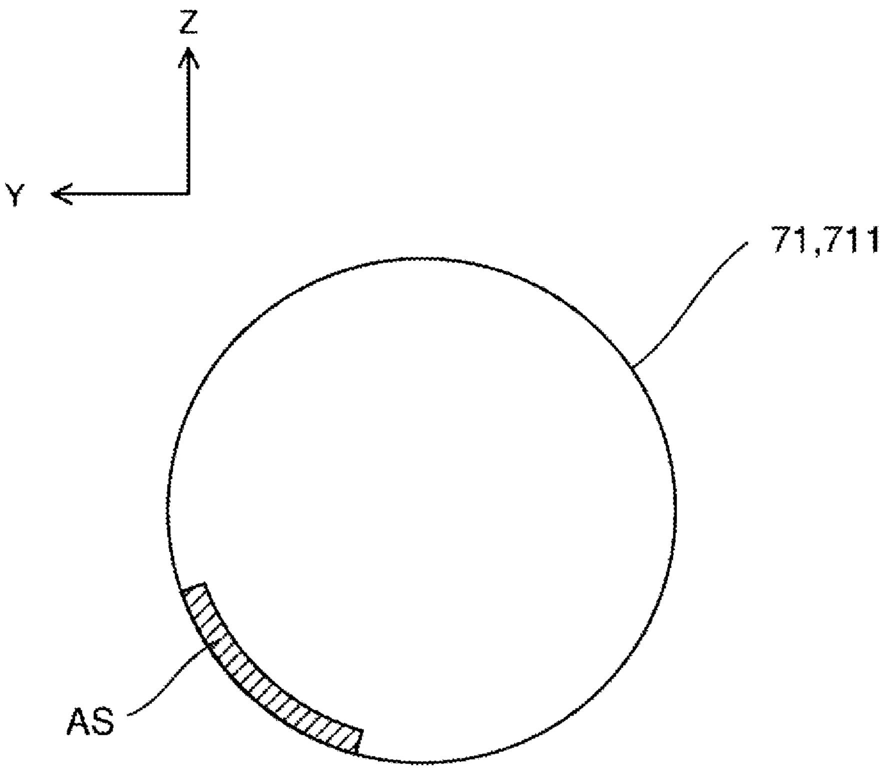
FIG. 15 is an explanatory diagram schematically illustrating a distribution of urea water adhering to an inner surface of the above-mentioned first exhaust gas piping in the above-mentioned comparative example.
Figure 16:
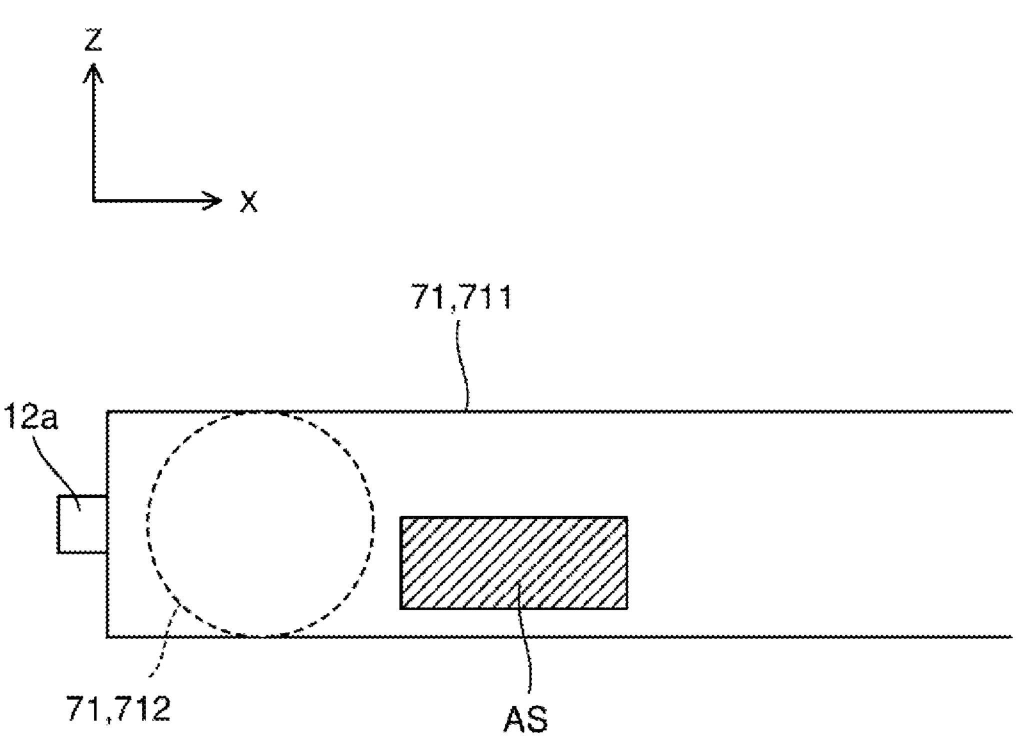
FIG. 16 is an explanatory diagram schematically illustrating a distribution of urea water adhering to an inner surface of the above-mentioned first exhaust gas piping in the above-mentioned comparative example.

FIG. 12 to FIG. 14 schematically illustrate exhaust gas flow in the first exhaust gas piping 71 in a case where the exhaust gas deflector plate 80 according to the present embodiment is not disposed at the connection part 74 between the first exhaust gas piping 71 and the second exhaust gas piping 72 (comparative example). As illustrated in FIG. 12, exhaust gas supplied from the second exhaust gas piping 72 flows almost equally in the upper portion and lower portion in the first exhaust gas piping 71 (second flow passage pipe 712). Therefore, as illustrated in FIG. 13 and FIG. 14, when the above-mentioned exhaust gas is supplied to the downstream side of the urea water injection device 12*a* (first flow passage pipe 711), and urea water is injected from the urea water injection device 12*a* against the above-mentioned exhaust gas, the injected urea water follows downward gravity to adhere to a lower portion of the inner surface of the first exhaust gas piping 71 (in particular, the first flow passage pipe 711) and to a position close to the urea water injection device 12*a*. FIG. 15 and FIG. 16 schematically illustrate distribution of urea water AS that adheres to the inner surface of the first exhaust gas piping 71 (in particular, the first flow passage pipe 711) in a comparative example. In the comparative example, the urea water adheres locally to the lower portion of the inner surface of the first exhaust gas piping 71, thereby causing a liquid pool of the urea water to easily occur, which results in increasing a risk of occurrence of deposits.

In order to reliably reduce the risk of the occurrence of deposits, it is desirable that a swirling flow of exhaust gas in the first exhaust gas piping 71 should easily occur by making the opening ratio AR2 of the second individual region 81B larger than the opening ratio AR1 of the first individual region 81A, as illustrated in FIG. 6. In other words, when one direction in which the plurality of the individual regions 81 are arranged is defined as the gravity direction, it is desirable that the opening ratios AR of the plurality of the individual regions 81 should preferably be greater from the up side (upstream side in the gravity direction) to the down side (downstream side in the gravity direction). In other words, it is preferable that the opening ratios AR of the plurality of the individual regions 81 should preferably be greater from one side in one direction to an other side.

Figure 17:
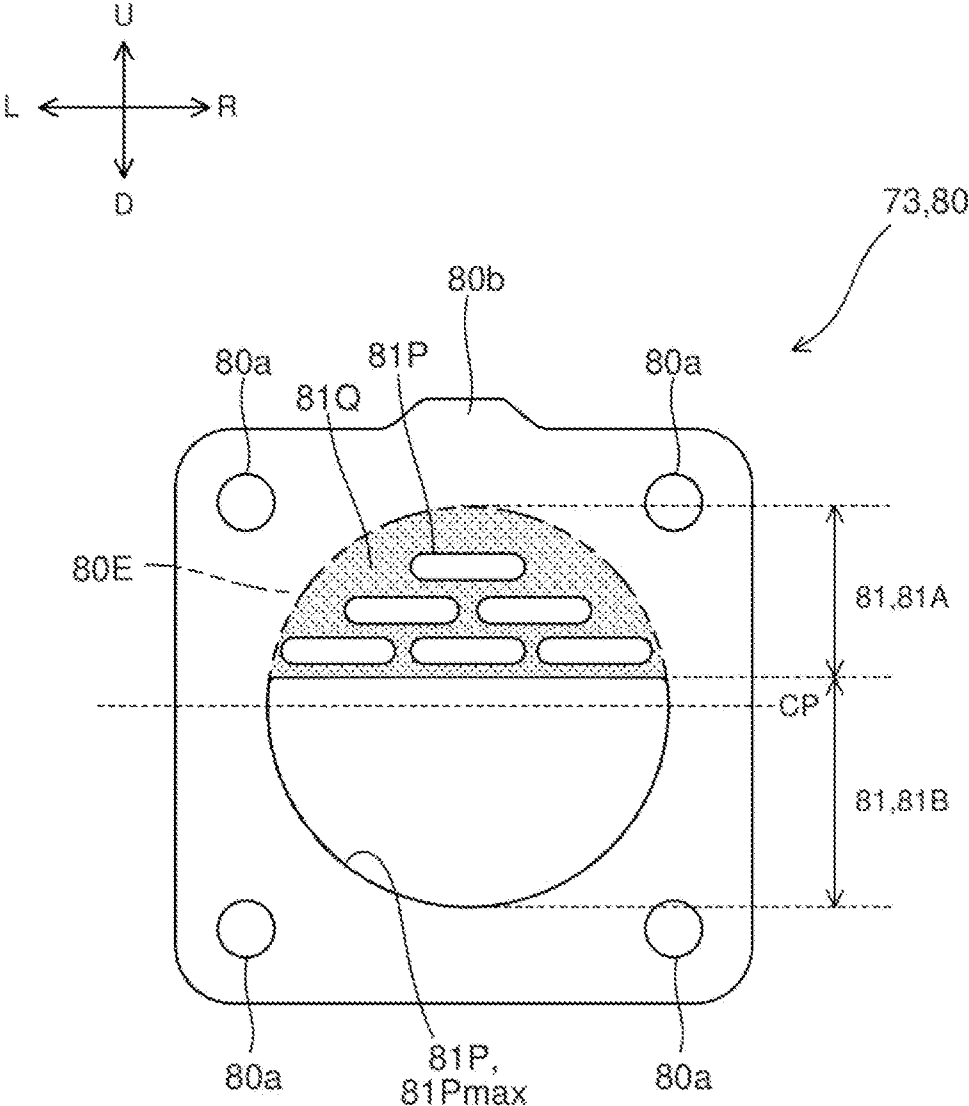
FIG. 17 is a front diagram schematically illustrating another configuration of the above-mentioned exhaust gas deflector plate.

FIG. 17 is a front diagram schematically illustrating another configuration of the exhaust gas deflector plate 80 as the exhaust gas deflector 73. As illustrated in the same figure, the opening part 81P provided in the individual region 81 (the second individual region 81B) that has the largest opening ratio AR in the plurality of the individual regions 81 may be located across a central part CP in the gravity direction. However, in a configuration illustrated in FIG. 17, the amount of exhaust gas that passes near the central part CP of the exhaust gas deflector plate 80 is greater. Therefore, there is a concern that the exhaust gas that has passed near the central part CP of the exhaust gas deflector plate 80 will strongly collide with urea water injected at a pre-designed angle from the urea water injection device 12*a*, thereby disrupting a track of the urea water.

In order to reduce the disturbance of the track of the urea water, it is desirable to restrain passage of exhaust gas to some extent in the central part CP of the exhaust gas deflector plate 80. For this purpose, it is preferable that the opening part 81P of the second individual region 81B that has the largest opening ratio AR should not be located near the central part CP of the exhaust gas deflector plate 80. From this viewpoint, as illustrated in FIG. 6, the opening part 81P provided in the individual region 81 (the second individual region 81B) which has the largest opening ratio AR in the plurality of the individual regions 81 is located at a lower side of the central part CP in the gravity direction in the exhaust gas deflector 73, that is to say, at an other side of the central part CP in one direction of the exhaust gas deflector 73.

In particular, it is desirable that the second individual region 81B should be located at a lower side of the first individual region 81A as illustrated in FIG. 6 in order to generate for sure the swirling flow that swirls from bottom to top at the downstream side of the urea water injection device 12A in the first exhaust gas piping 71 as illustrated in FIG. 7 and FIG. 8 while restraining passage of exhaust gas to some extent at the central part CP of the exhaust gas deflector plate 80. In other words, it is desirable that the individual region 81 (the second individual region 81B) that has the largest opening ratio AR in the plurality of the individual regions 81 should be located at the lower side (at an other side in one direction) than a different individual region 81 (the first individual region 81A).

Figure 18:
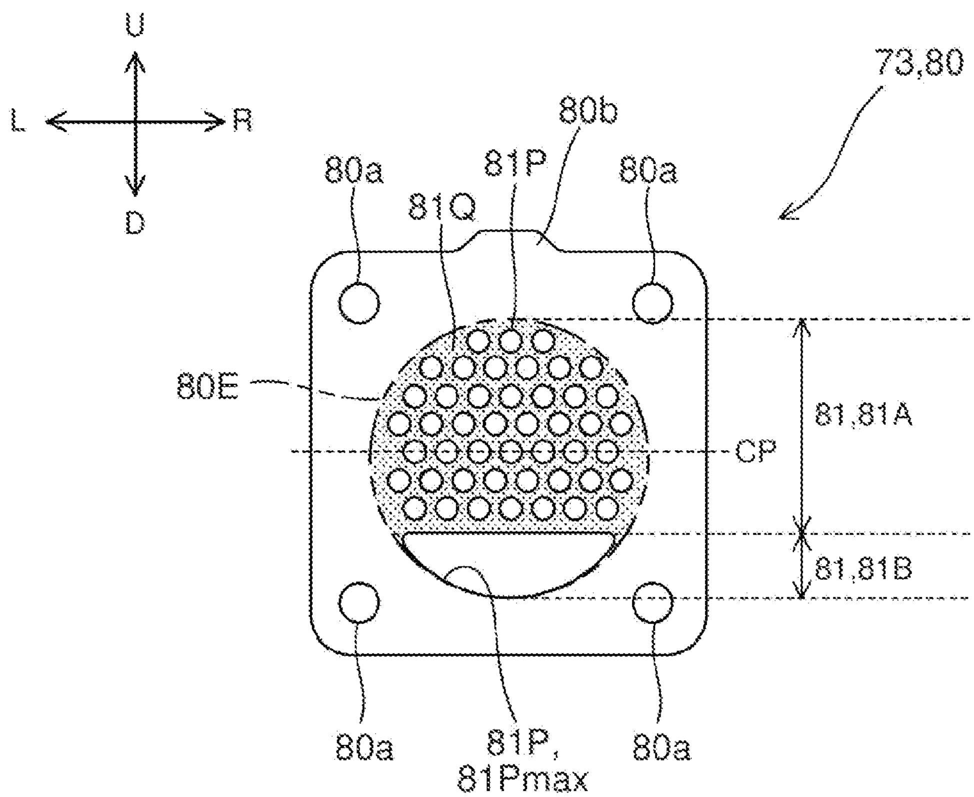
FIG. 18 is a front diagram schematically illustrating yet another configuration of the above-mentioned exhaust gas deflector plate.

FIG. 18 is a front view schematically illustrating yet another configuration of the exhaust gas deflector plate 80 as the exhaust gas deflector 73. As illustrated in the same figure, the opening part 81P that is provided in the first individual region 81A may be circular (true circle). Although not illustrated in the figure, the opening part 81P that is provided in the first individual region 81A may be square.

However, from the viewpoint that it is easier to decrease the area of the peripheral region 81Q and increase the opening ratio AR in the first individual region 81A, it is desirable that the opening part 81P of the first individual region 81A should be a long hole in the left-right direction, as illustrated in FIG. 6 and FIG. 17. Although not illustrated in the figure, the opening part 81P of the first individual region 81A may be a long hole in the up and down direction or a long hole in an oblique direction where the up and down direction and the left and right direction intersects with each other. That is to say, it is desirable that the opening part 81P that is provided in a different individual region 81 (the first individual region 81A) excluding the second individual region 81B that has the largest opening ratio AR in the plurality of the individual regions 81 should have a longitudinal direction.

In addition, if the opening ratio of the different individual region 81 (the first individual region 81A) is low, a flow of exhaust gas in an upper side of the exhaust gas deflector plate 80 is restricted and more exhaust gas passes through a lower side of the exhaust gas deflector plate 80. This may cause a swirling velocity of the swirling flow generated inside the first exhaust gas piping 71 to become too fast, thereby causing urea water to locally collide with the inner surface of the first exhaust gas piping 71 to adhere thereto, and therefore, there is a concern about increasing the risk of generation of deposits. In order to keep the swirling velocity of the above-mentioned swirling flow within an appropriate range, it is desirable to relax restriction on passage of exhaust gas that passes through the different individual region 81 (first individual region 81A). The above-mentioned configuration in which the opening part 81P of the first individual region 81A has a longitudinal direction (in comparison with the configuration in which the opening part 81P is a perfect circle, or the like) can increase the opening ratio AR1 in the first individual region 81A, and therefore, it is preferable in that it is also possible to relax restriction on the passage of exhaust gas and keep the swirling velocity of the swirling flow within an appropriate range.

In particular, from the viewpoint of forming a plurality of the opening parts 81P by punching work using a same die to improve productivity of the exhaust gas deflector plate 80 as the exhaust gas deflector 73, it is desirable that the above-mentioned different individual region 81 (the first individual region 81A) should have a plurality of the opening parts 81P having the same shape as illustrated in FIG. 6 and FIG. 17.

Figure 19:
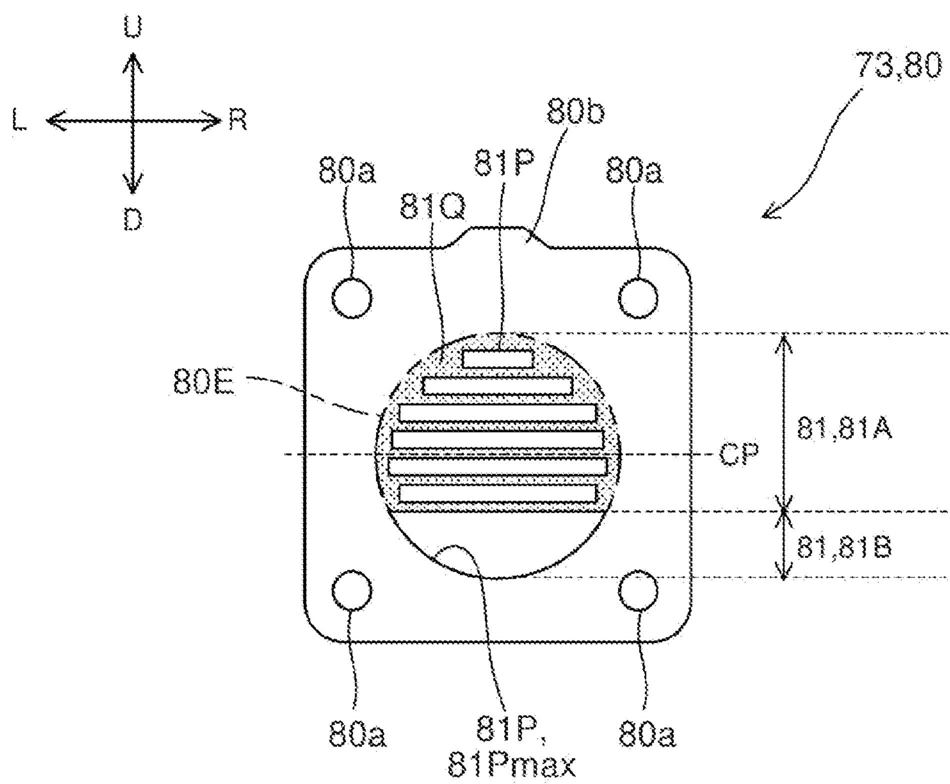
FIG. 19 is a front diagram schematically illustrating yet another configuration of the above-mentioned exhaust gas deflector plate.

It is noted that the shape of the opening part 81P having a longitudinal direction is not limited to a long shape with an arc part as illustrated in FIG. 6 and FIG. 17. FIG. 19 is a front diagram schematically showing yet another configuration of the exhaust gas deflector plate 80 as the exhaust gas deflector 73. As illustrated in the same figure, the opening part 81P having a longitudinal direction may be formed in a rectangular shape long in the left and right direction. Although not illustrated in the figure, the opening part 81P having a longitudinal direction may be formed in a rectangular shape long in an up and down direction or in a diagonal direction.

In order to mix urea water solution injected from the urea water injection device 12$a$ illustrated in FIG. 4 with exhaust gas that has passed through the exhaust gas deflector plate 80 so as to make even, it is desirable that the exhaust gas that has passed through the opening part 81P should be evenly applied to, in the urea water injected from the urea water injection device 12$a$, urea water at a side closer to the urea water injection device 12$a$ (at the upstream side in the X direction) and the urea water at a side farther from urea water injection device 12$a$ (at the downstream in the X direction). For this purpose, the exhaust gas deflector plate 80 as the exhaust gas deflector 73 should be preferably symmetrical in shape in the left and right direction, as illustrated in FIG. 6, FIG. 17, and FIG. 18. That is to say, the exhaust gas deflector 73 should be preferably symmetrical in one direction, which is the gravity direction, and in a different direction, which is vertical.

Figure 20:
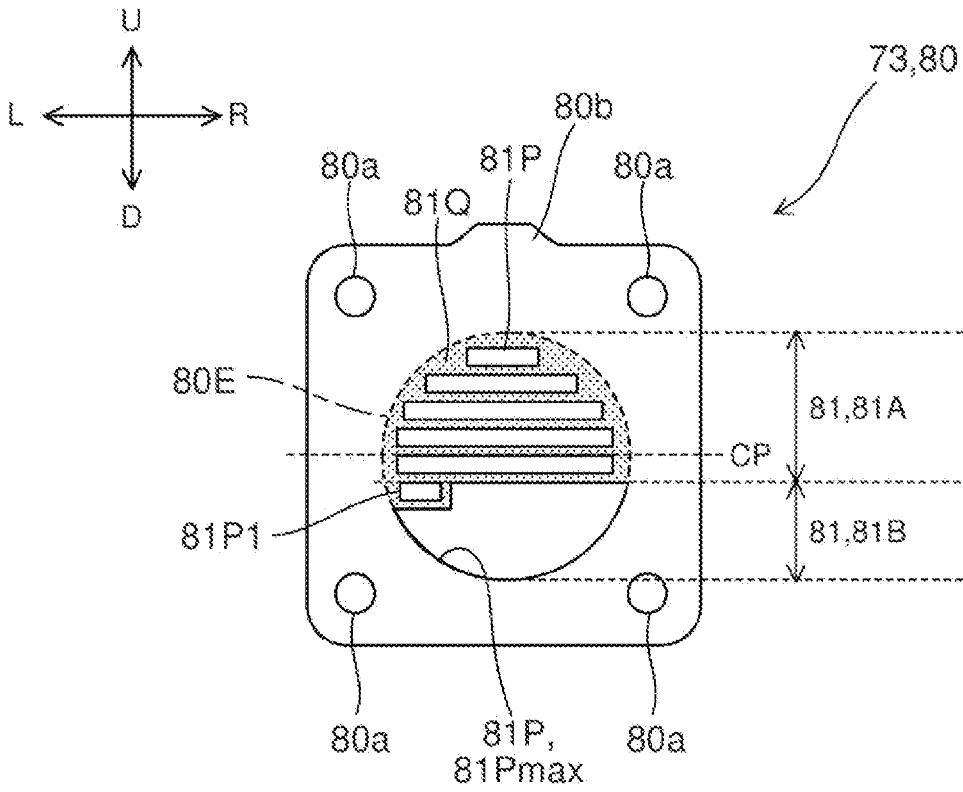
FIG. 20 is a front diagram schematically illustrating yet another configuration of the above-mentioned exhaust gas deflector plate.

FIG. 20 is a front diagram schematically illustrating yet another configuration of the exhaust gas deflector plate 80 as the exhaust gas deflector 73. In terms of generating a clean swirling flow by reducing disturbance of the track of urea water immediately after being injected from the urea water injection device 12$a$ illustrated in FIG. 4, it is desirable that the less amount of the exhaust gas that has passed through the opening part 81P in the exhaust gas deflector plate 80 should be applied to, in the urea water injected from the urea water injection device 12$a$, urea water at a side closer to the urea water injection device 12$a$ (at the upstream side in the X direction), not urea water at a side farther from the urea water injection device 12$a$ (at the downstream side in the X direction). For this purpose, the exhaust gas deflector plate 80 as the exhaust gas deflector 73 should be preferably asymmetrical in shape in the left and right direction, as illustrated in FIG. 20. That is to say, the exhaust gas deflector 73 should be preferably asymmetrical in one direction, which is a gravity direction, and in the different direction, which is vertical.

In a configuration example illustrated in FIG. 20, the second individual region 81B comprises an opening part 81Pmax that has the largest opening area, and an opening part 81P1 that has a small opening area. The opening part 81P1 is disposed at an upper left portion of the opening part 81Pmax through the peripheral region 81Q. In this configuration, the opening ratio of the exhaust gas deflector plate 80 is smaller at the left side thereof and larger at the right side thereof.

Therefore, the exhaust gas deflector plate 80 should be disposed between the first exhaust gas piping 71 and the second exhaust gas piping 72 so that the left side of the exhaust gas deflector plate 80 (which has a smaller opening ratio) is at a side closer to the urea water injection device 12$a$ and the right side (which has a larger opening ratio) is farther from the urea water injection device 12$a$, when viewed from the upstream side in the Y direction in FIG. 4. This disposition enables the less amount of the exhaust gas that has passed through the opening part 81P in the exhaust gas deflector plate 80 to be applied to the urea water closer to the urea water injection device 12A not the urea water farther from the urea water injection device 12A.

4. Modified Example

Figure 21:
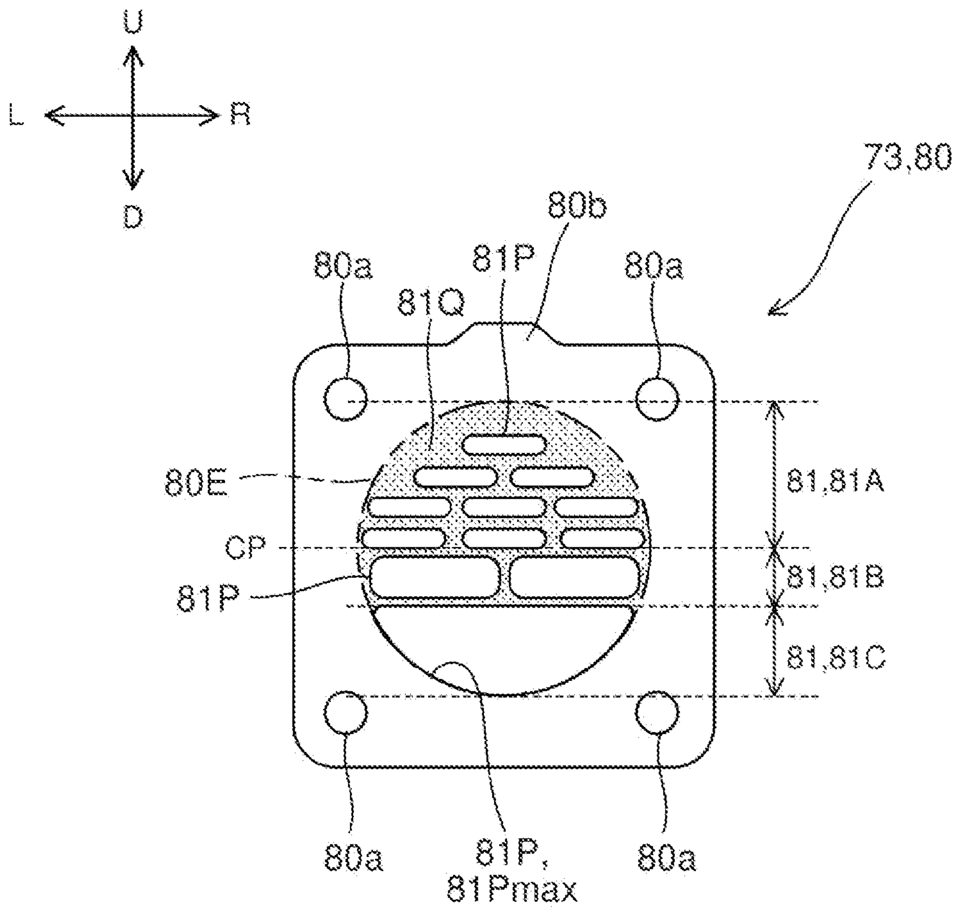
FIG. 21 is a front diagram schematically illustrating yet another configuration of the above-mentioned exhaust gas deflector plate.

FIG. 21 is a front diagram schematically illustrating yet another configuration of the exhaust gas deflector plate 80. As illustrated in the figure, the plurality of the individual regions 81 may further include a third individual region 81C in addition to the first individual region 81A and the second individual region 81B. The first individual region 81A, the second individual region 81B, and the third individual region 81C are arranged in this order downward from the above. In this case, the opening ratio of the third individual region 81C is AR3(%), which leads to AR1<AR2<AR3. It is noted that the third individual region 81C that has the largest opening ratio is assumed to be disposed below the central part CP in the up and down direction.

Even in this configuration of the exhaust gas deflector plate 80, a swirling flow that swirls from bottom to top can be easily generated at the downstream side of the urea water injection device 12*a* (refer to FIG. 4, and the like), so that the above-mentioned effect according to the present embodiments can be achieved. It is noted that the exhaust gas deflector plate 80 may include four or more individual regions 81, with the opening ratio of each one of individual regions 81 being greater from top to bottom.

Figure 22:
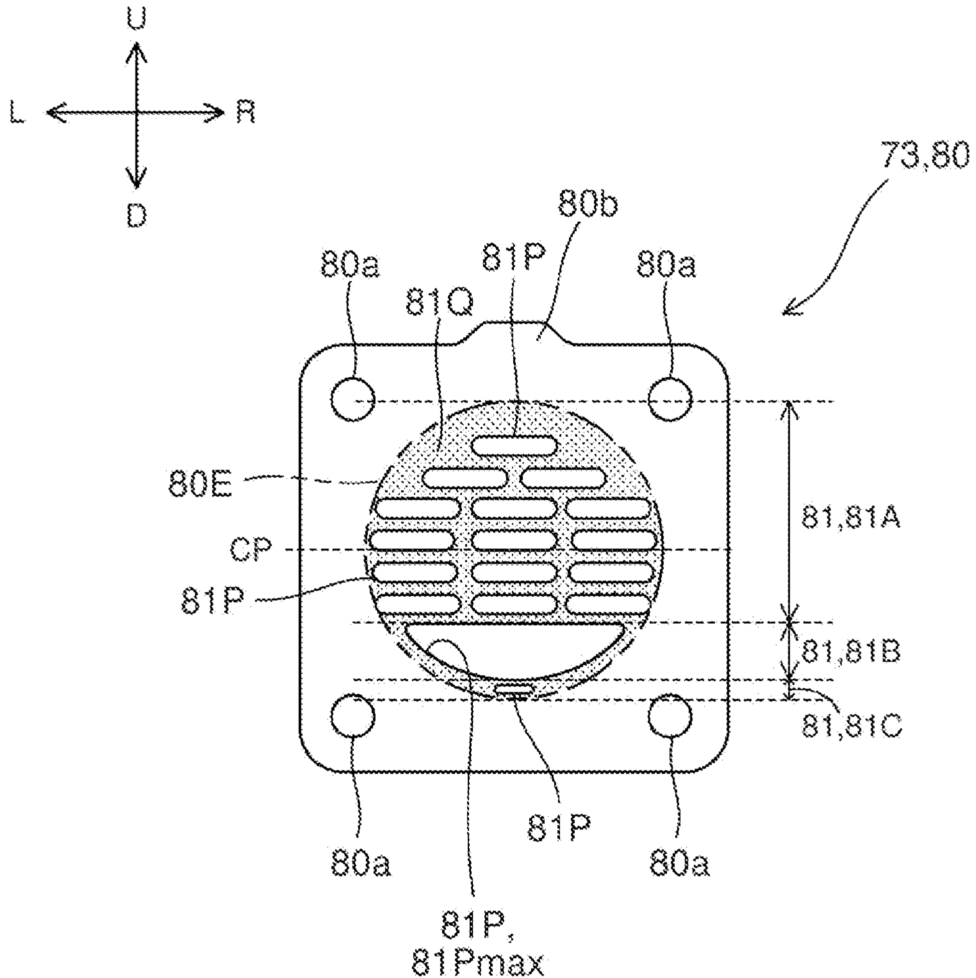
FIG. 22 is a front diagram schematically illustrating yet another configuration of the above-mentioned exhaust gas deflector plate.

FIG. 22 is a front view schematically illustrating yet another configuration of the exhaust gas deflector plate 80. As illustrated in the figure, AR3<AR1<AR2 may be acceptable in a configuration where the plurality of the individual regions 81 include the first individual region 81A, the second individual region 81B, and the third individual region 81C, which are arranged in this order downward from the above. That is to say, a different individual region 81 (the third individual region 81C in the example in FIG. 22), which has a relatively small opening ratio, may be disposed below the individual region 81 (the second individual region 81B in the example in FIG. 22) that has the largest opening ratio in the plurality of the individual regions. It is noted that the second individual region 81B that has the largest opening ratio is assumed to be disposed below the central part CP in the up and down direction.

While this configuration enables the amount of exhaust gas flowing at a down side of the first exhaust gas piping 71 (second flow passage pipe 712) to be reduced compared to the configuration in FIG. 6, it is still possible to generate a swirling flow that swirls upward from down at the downstream side of the urea water injection device 12*a* (refer to FIG. 4, and the like), and therefore, the above-mentioned effect according to the present embodiment can be achieved.

The exhaust gas deflector 73 may be a welded component that is directly attached by welding to the inside of the first exhaust gas piping 71 or the second exhaust gas piping 72 at the upstream side of the urea water injection device 12*a* in addition to being formed by a plate-shaped exhaust gas deflector plate 80 sandwiched between the first flange part 71F and the second flange part 72F.

5. Supplemental Description

Although according to the present embodiment, the configuration illustrated in FIG. 3 where the exhaust gas rectifier 70 is disposed at the downstream side of the DPF system 11 is described, the exhaust gas rectifier 70 is not limited to the configuration. For example, in the exhaust gas purification system 60, a layout may have the exhaust gas rectifier 70, the SCR system 12, the DPF system 11, and the SCR system 12, lined up in that order from an upstream side in the direction in which exhaust gas flows.

6. Note

The exhaust gas rectifier and exhaust gas purification system described in the present embodiment can be expressed as in the following Notes (1) through (15).

The exhaust gas rectifier of Note (1) has an exhaust gas deflector located at an upstream side with respect to a urea water injection device in a direction in which exhaust gas flows, wherein the exhaust gas deflector includes a plurality of individual regions having an opening through which exhaust gas passes, the plurality of the individual regions are arranged in one direction, and the opening ratio in the plurality of the individual regions are different in the one direction.

In the exhaust gas rectifier of Note (2) according to Note (1), the opening ratios of the plurality of the individual regions are greater from one side in the one direction to an other side.

In the exhaust gas rectifier of Note (3) according to Note (2), the opening part provided in the individual region that has the largest opening ratio in the plurality of the individual regions is disposed at the other side from a central part in one direction of the exhaust gas deflector.

In the exhaust gas rectifier of Note (4) according to Note (3), the individual region that has the largest opening ratio in the plurality of the individual regions is disposed at the other side with respect to the other individual regions.

In the exhaust gas rectifier according to Note (5) according to Note (4), an opening part provided in the different individual region has a longitudinal direction.

In the exhaust gas rectifier according to Note (6) according to Note (5), the different individual regions have a plurality of the opening parts having the same shape.

In the exhaust gas rectifier of Note (7) according to any one of Notes (1) to (6), the exhaust gas deflector is symmetrically shaped in a different direction perpendicular to the one direction.

In the exhaust gas rectifier of Note (8) according to any one of Notes (1) to (6), the exhaust gas deflector is asymmetrically shaped in a different direction perpendicular to the one direction.

The exhaust gas rectifier of Note (9) according to any one of Notes (1) to (8) further comprises a first exhaust gas piping to which the urea water injection device is attached and a second exhaust gas piping disposed at an upstream side of the first exhaust gas piping, wherein the exhaust gas deflector includes an exhaust gas deflector plate, which is disposed at a connection part that connects the first exhaust gas piping with the second exhaust gas piping.

In the exhaust gas rectifier of Note (10) according to Note (9), the connection part includes a first flange part provided in the first exhaust gas piping and a second flange part provided in the second exhaust gas piping, and the exhaust gas deflector plate is attached between the first flange part and the second flange part.

The exhaust gas rectifier of Note (11) according to any one of Notes (1) to (8) further comprises a first exhaust gas piping to which the urea water injection device is attached and a second exhaust gas piping that is disposed at an upstream side of the first exhaust gas piping, wherein the first exhaust gas piping has a first bending part, the second exhaust gas piping has a second bending part, and the exhaust gas deflector is disposed between the first bending part and the second bending part.

In the exhaust gas rectifier of Note (12) according to Note (11), the urea water injection device is attached to the first bending part, and the exhaust gas deflector is disposed closer to the first bending part than the center between the first bending part and the second bending part.

In the exhaust gas rectifier of Note (13) according to any one of Notes (1) to (12), the one direction is a gravity direction.

The exhaust gas purification system of Note (14) further comprises an exhaust gas rectifier according to any one of Notes (1) to (13), a DPF system, and an SCR system including the urea water injection device.

In the exhaust gas purification system of Note (15) according to Note (14), the DPF system is disposed at an upstream side of the exhaust gas rectifier.

Although embodiments of the present invention description have been given of above, the scope of the invention is not limited thereto, and can be expanded or modified without deviating from the gist of the present invention.

INDUSTRIAL APPLICABILITY

The present invention can be used for work vehicles such as tractors.

REFERENCE SIGNS LIST

12*a* urea water injection device
60 exhaust gas purification system
70 exhaust gas rectifier
71 first exhaust gas piping
71B first bending part
71F first flange part
72 second exhaust gas piping
72B second bending part
72F second flange part
73 exhaust gas deflector
74 connection part
80 exhaust gas deflector plate (exhaust gas deflector)
81 individual region
81A first individual region (individual region)
81B second individual region (individual region)
81C third individual region (individual region)
81P opening part
81Pmax opening part
81Q peripheral region

The invention claimed is:

1. An exhaust gas rectifier comprising an exhaust gas deflector disposed at an upstream side with respect to a urea water injection device in a direction in which an exhaust gas flows, wherein the exhaust gas deflector includes a plurality of individual regions having an opening part through which the exhaust gas passes, wherein the plurality of the individual regions are aligned in a vertical direction, and wherein opening ratios of the plurality of individual regions increase from a first side in the vertical direction to a second side in the vertical direction, wherein the first side and the second side are on opposite sides of a central part of the exhaust gas deflector, and;

a first exhaust gas pipe comprising a first bending part that connects to the exhaust gas deflector, wherein the first exhaust gas pipe and the first bending part are both disposed upstream of the exhaust gas deflector in the direction of the exhaust gas flows.

2. The exhaust gas rectifier according to claim 1, wherein the opening part provided in a second individual region in the plurality of individual regions is disposed at the second side and comprises a largest opening ratio of the opening ratios of the plurality of individual regions.

3. The exhaust gas rectifier according to claim 2, wherein other individual regions in the plurality of individual regions are disposed on the first side, wherein the other individual regions do not include the second individual region.

4. The exhaust gas rectifier according to claim 3, wherein an opening part provided in each of the other individual regions has a longitudinal direction.

5. The exhaust gas rectifier according to claim 4, wherein the other individual regions each have a plurality of the opening parts having the same shape.

6. The exhaust gas rectifier according to claim 1, wherein the exhaust gas deflector is symmetric in a direction perpendicular to the vertical direction.

7. The exhaust gas rectifier according to claim 1, wherein the exhaust gas deflector is asymmetric in a direction perpendicular to the vertical direction.

8. The exhaust gas rectifier according to claim 1, further comprising:

a second exhaust gas pipe to which the urea water injection device is attached; and wherein the first exhaust gas pipe is disposed at an upstream side of the second exhaust gas pipe, wherein the exhaust gas deflector includes an exhaust gas deflector plate, the exhaust gas deflector plate being disposed at a connection part that connects the first exhaust gas pipe with the second exhaust gas pipe.

9. The exhaust gas rectifier according to claim 8, wherein the connection part includes a first flange part provided in the first exhaust gas pipe and a second flange part provided in the second exhaust gas pipe, and the exhaust gas deflector plate is attached between the first flange part and the second flange part.

10. The exhaust gas rectifier according to claim 1, further comprising:

a second exhaust gas pipe to which the urea water injection device is attached, and wherein the first exhaust gas pipe is disposed at an upstream side of the second exhaust gas pipe, wherein the second exhaust gas pipe has a second bending part, and the exhaust gas deflector is disposed between the first bending part and the second bending part.

11. The exhaust gas rectifier according to claim 10, wherein the urea water injection device is attached to the second bending part, and the exhaust gas deflector is disposed closer to the second bending part than a midpoint between the first bending part and the second bending part.

12. The exhaust gas rectifier according to claim 1, wherein the vertical direction is a gravity direction.

13. An exhaust gas purification system comprising:

an exhaust gas rectifier according to claim 1;

a Diesel Particulate Filter (DPF) system; and a Selective Catalytic Reduction system including the urea water injection device.

14. The exhaust gas purification system according to claim 13, wherein the DPF system is disposed at an upstream side of the exhaust gas rectifier.

* * * * *